(12) United States Patent
Li

(10) Patent No.: US 12,087,018 B2
(45) Date of Patent: Sep. 10, 2024

(54) COLOR CALIBRATION METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventor: Rui Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/487,077

(22) Filed: Oct. 14, 2023

(65) Prior Publication Data

US 2024/0037795 A1 Feb. 1, 2024

Related U.S. Application Data

(63) Continuation of application No. PCT/CN2023/074580, filed on Feb. 6, 2023.

(30) Foreign Application Priority Data

Mar. 29, 2022 (CN) .......................... 202210319427.2

(51) Int. Cl.
*G06T 11/00* (2006.01)
*G06T 7/80* (2017.01)
(Continued)

(52) U.S. Cl.
CPC ............... *G06T 7/90* (2017.01); *G06T 7/80* (2017.01); *G06T 11/001* (2013.01); *G09G 3/32* (2013.01);
(Continued)

(58) Field of Classification Search
CPC .... G06T 7/00; G06T 7/90; G06T 7/80; G06T 11/001; G06T 2207/10024;
(Continued)

(56) References Cited

U.S. PATENT DOCUMENTS

2007/0091113 A1* 4/2007 Jones ..................... G09B 29/02
345/592
2007/0273939 A1* 11/2007 Kishida ................ H04N 1/6013
358/504
(Continued)

FOREIGN PATENT DOCUMENTS

CN          103765503 A  *  4/2014    .............. G01J 3/506
CN          105336308 A      2/2016
(Continued)

OTHER PUBLICATIONS

The World Intellectual Property Organization (WIPO) International Search Report for PCT/CN2023/074580 Mar. 17, 2023 11 Pages (including translation).
(Continued)

*Primary Examiner* — Wesner Sajous
(74) *Attorney, Agent, or Firm* — Anova Law Group, PLLC

(57) ABSTRACT

A color calibration method includes acquiring first pictures in a first color space, a first picture being generated by one pure color; converting brightness of the first pictures from the first color space to a second color space to obtain second pictures in the second color space to display through a display device; acquiring photographed pictures by photographing the second pictures, the photographed pictures corresponding to a third color space; converting the photographed pictures from the third color space to the first color space to obtain photographed pictures in the first color space, and determining photographing color information corresponding to the photographed pictures in the first color
(Continued)

space; and determining a difference between standard color information of the first color space and the photographing color information, and determining color calibration information according to the difference, the color calibration information being used for performing color calibration on a picture.

20 Claims, 10 Drawing Sheets

(51) Int. Cl.
*G06T 7/90* (2017.01)
*G09G 3/32* (2016.01)
*G09G 5/02* (2006.01)
*H04N 5/202* (2023.01)
*H04N 5/57* (2006.01)
*H04N 13/15* (2018.01)
*H04N 23/85* (2023.01)

(52) U.S. Cl.
CPC ... *H04N 23/85* (2023.01); *G06T 2207/10024* (2013.01); *G09G 2320/0693* (2013.01); *G09G 2340/06* (2013.01)

(58) Field of Classification Search
CPC .. G06T 2207/10028; G09G 3/32; G09G 3/22; G09G 5/02; G09G 5/06; G09G 2320/0666; G09G 2320/0693; G09G 2320/06; G09G 2320/02; G09G 2320/04; G09G 2320/0276; G09G 2320/0271; G09G 2320/0626; G09G 2320/0673; G09G 2320/0686; H04N 23/85; H04N 23/00; H04N 23/10; H04N 23/70–72; H04N 1/60; H04N 1/619; H04N 1/6027; H04N 1/6041; H04N 5/202; H04N 5/57–58; H04N 19/00; H04N 13/15; H04N 13/254; H04N 13/324; H04N 13/327; H04N 9/64; H04N 9/646; H04N 9/67–68; H04N 9/73; H04N 9/77–78

See application file for complete search history.

(56) References Cited

U.S. PATENT DOCUMENTS

| 2009/0153745 | A1 | 6/2009 | Park et al. |
| 2014/0153825 | A1* | 6/2014 | Jones .................. G06T 5/00 382/167 |
| 2019/0226830 | A1* | 7/2019 | Edwin .................. G06T 19/006 |
| 2023/0073331 | A1* | 3/2023 | DeFilippis ........... G02B 27/141 |
| 2023/0196966 | A1* | 6/2023 | DeFilippis ........... H04N 9/3158 345/594 |

FOREIGN PATENT DOCUMENTS

| CN | 111179801 A | 5/2020 |
| CN | 111429827 A | 7/2020 |

OTHER PUBLICATIONS

Wikipedia contributors, 'SRGB color space', Wikipedia, free encyclopedia, Apr. 14, 2023 <-{R|https://zh.wikipedia.org/w/index.php?title=SRGB%E8%89%B2%E5%BD%A9%E7%A9%BA%E9%97%B4&oldid=76808134}-> [accessed Apr. 14, 2023].

Jiajie Zhang, "Color space representation and conversion", Originally published in bizarre and motley Dec. 9, 2016, https://zhuanlan.zhihu.com/p/24281841.

ICVFX, steps to calibrate LED wall content for filming with a specific camera. https://docs.unrealengine.com/4.27/zh-CN/WorkingWithMedia/IntegratingMedia/InCameraVFX/InCameraVFXCameraCalibration/ 18 Pages.

The World Intellectual Property Organization (WIPO) International Search Report and Written Opinion for PCT/CN2023/074580 Mar. 17, 2023 14 Pages (including translation).

* cited by examiner

COLOR CALIBRATION METHOD AND APPARATUS, COMPUTER DEVICE, AND COMPUTER-READABLE STORAGE MEDIUM

CROSS-REFERENCES TO RELATED APPLICATIONS

This application is a continuation application of PCT Patent Application No. PCT/CN2023/074580, filed on Feb. 6, 2023, which claims priority to Chinese Patent Application No. 2022103194272, filed with the China National Intellectual Property Administration on Mar. 29, 2022, which is incorporated by reference in its entirety.

FIELD OF THE TECHNOLOGY

The present disclosure relates to the field of computer technologies and, particularly relates to a color calibration method and apparatus, a computer device, a computer-readable storage medium, and a computer program product.

BACKGROUND OF THE DISCLOSURE

Photographing devices for photographing images and videos, and display devices for information display are widely used. A user may also display photographed images or videos through the display device to enlarge the images or videos for viewing or perform related operations.

However, when images photographed by photographing devices are displayed on display devices, different photographing devices and different display devices may present the same image with color variations. One problem is that the color of the image displayed by the display device is significantly different from the color of the image generated by the photographing device.

SUMMARY

According to various embodiments of present disclosure, a color calibration method performed by a computer device is provided. The method includes acquiring a plurality of first pictures in a first color space, a first picture of the plurality of first pictures being generated by one pure color; converting brightness of the plurality of first pictures from the first color space to a second color space to obtain second pictures in the second color space to display the second pictures through a display device; acquiring photographed pictures by photographing the second pictures displayed by the display device, the photographed pictures corresponding to a third color space; converting the photographed pictures from the third color space to the first color space to obtain photographed pictures in the first color space, and determining photographing color information corresponding to the photographed pictures in the first color space; and determining a difference between standard color information of the first color space and the photographing color information, and determining color calibration information according to the difference, the color calibration information being used for performing color calibration on a picture for calibration.

According to various embodiments of present disclosure, a computer device is provided including a memory and one or more processors, the memory storing computer-readable instructions that, when being executed, causes the one or more processors to perform: acquiring a plurality of first pictures in a first color space, a first picture of the plurality of first pictures being generated by one pure color; converting brightness of the plurality of first pictures from the first color space to a second color space to obtain second pictures in the second color space to display the second pictures through a display device; acquiring photographed pictures by photographing the second pictures displayed by the display device, the photographed pictures corresponding to a third color space; converting the photographed pictures from the third color space to the first color space to obtain photographed pictures in the first color space, and determining photographing color information corresponding to the photographed pictures in the first color space; and determining a difference between standard color information of the first color space and the photographing color information, and determining color calibration information according to the difference, the color calibration information being used for performing color calibration on a picture for calibration.

According to various embodiments of present disclosure, a non-transitory computer readable storage medium is provided for storing a computer program that, when being executed, causes one or more processors to perform: acquiring a plurality of first pictures in a first color space, a first picture of the plurality of first pictures being generated by one pure color; converting brightness of the plurality of first pictures from the first color space to a second color space to obtain second pictures in the second color space to display the second pictures through a display device; acquiring photographed pictures by photographing the second pictures displayed by the display device, the photographed pictures corresponding to a third color space; converting the photographed pictures from the third color space to the first color space to obtain photographed pictures in the first color space, and determining photographing color information corresponding to the photographed pictures in the first color space; and determining a difference between standard color information of the first color space and the photographing color information, and determining color calibration information according to the difference, the color calibration information being used for performing color calibration on a picture for calibration.

Details of one or more embodiments of the present disclosure are set forth in the accompanying drawings and the description below. Other features, purposes, and advantages of the present disclosure will be apparent from the description, the accompanying drawings, and the claims.

BRIEF DESCRIPTION OF THE DRAWINGS

To describe the technical solutions in the embodiments of the present disclosure or in the related art more clearly, the following briefly introduces the accompanying drawings required by the embodiments or the related art. Apparently, the accompanying drawings in the following description show merely some embodiments of the present disclosure, and a person skilled in the art may also obtain accompanying drawings of other embodiments according to these accompanying drawings without creative efforts.

DESCRIPTION OF EMBODIMENTS

To make the purposes, technical solutions, and advantages of the present disclosure clearer, the following further describes the present disclosure in detail with reference to the accompanying drawings and the embodiments. It is to be understood that the specific embodiments described herein are only used for illustration purposes, and are not used for limiting the scope of the present disclosure.

Embodiments of the present disclosure may be applied to various scenes, including but not limited to cloud technology, artificial intelligence (AI), intelligent transport, assisted driving, etc. For example, it may be applied to the technical field of AI, where AI is a theory, method, technology, and application system that utilizes a digital computer or a machine controlled by the digital computer to simulate, extend, and expand human intelligence, perceive an environment, acquire knowledge, and use the knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The solution provided by the embodiments of the present disclosure relates to a color calibration method of AI and is specifically illustrated by the following embodiments.

Figure 1:
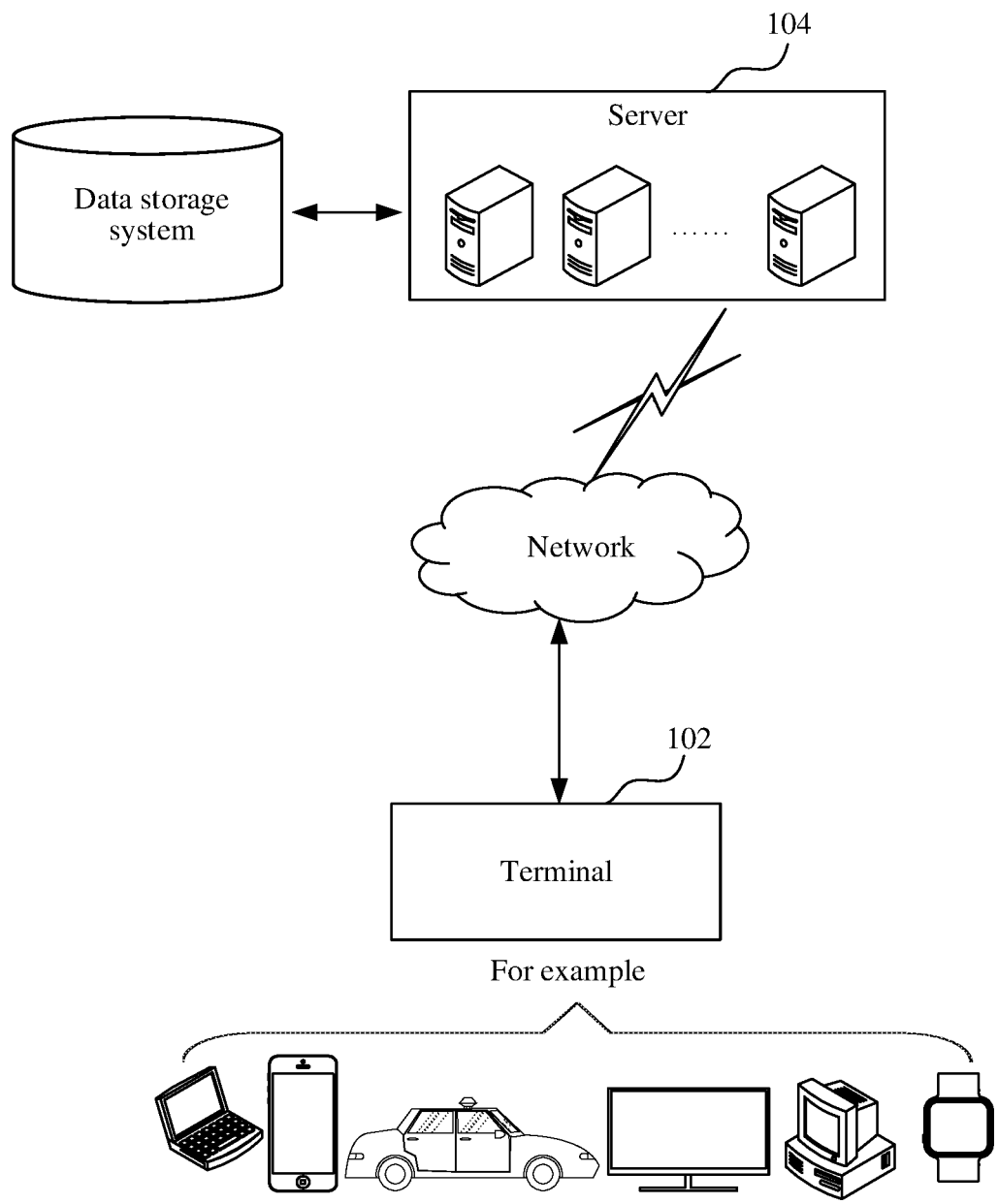
FIG. 1 is a diagram of an application environment of a color calibration method according to one embodiment of present disclosure.

The color calibration method provided by embodiments of the present disclosure may be applied to an application environment as shown in FIG. 1. A terminal 102 communicates with a server 104 through a network. A data storage system may store data that needs to be processed by the server 104. The data storage system may be integrated on the server 104 or may be placed on a cloud or other servers. Both the terminal 102 and the server 104 may independently perform the color calibration method provided in embodiments of the present disclosure. The terminal 102 and the server 104 may also cooperate to perform the color calibration method provided in embodiments of the present disclosure. When the terminal 102 and the server 104 cooperate to perform the color calibration method provided in embodiments of the present disclosure, the terminal 102 acquires a plurality of first pictures in a first color space, each first picture being generated by one pure color, and transmits the first pictures to the server 104. The server 104 converts brightness of each of the first pictures from the first color space to a second color space to obtain second pictures in the second color space to display each of the second pictures through a display device. The terminal 102 photographs each of the second pictures displayed by the display device and transmits the photographed pictures by photographing to the server 104, the photographed pictures corresponding to a third color space. The server 104 converts each of the photographed pictures from the third color space to the first color space to obtain photographed pictures in the first color space and determines photographing color information corresponding to each of the photographed pictures in the first color space. The server 104 determines a difference between standard color information of the first color space and the photographing color information, determines color calibration information according to the difference, and returns the same to the terminal 102; the color calibration information is used for performing color calibration on a picture for calibration (e.g., to be calibrated). The terminal 102 may be, but is not limited to, various desktop computers, notebook computers, smart phones, tablet computers, intelligent voice interaction devices, intelligent home appliances, vehicle terminals, aircraft, etc. An application program may run on the terminal 102, and the application program may be a communication application, an audio-video application, an image processing application, etc. The server 104 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, CDN, and a large data and AI platform.

It should be noted that the reference to "a plurality of" and the like in the various embodiments of the present disclosure all refer to "at least two".

Figure 2:
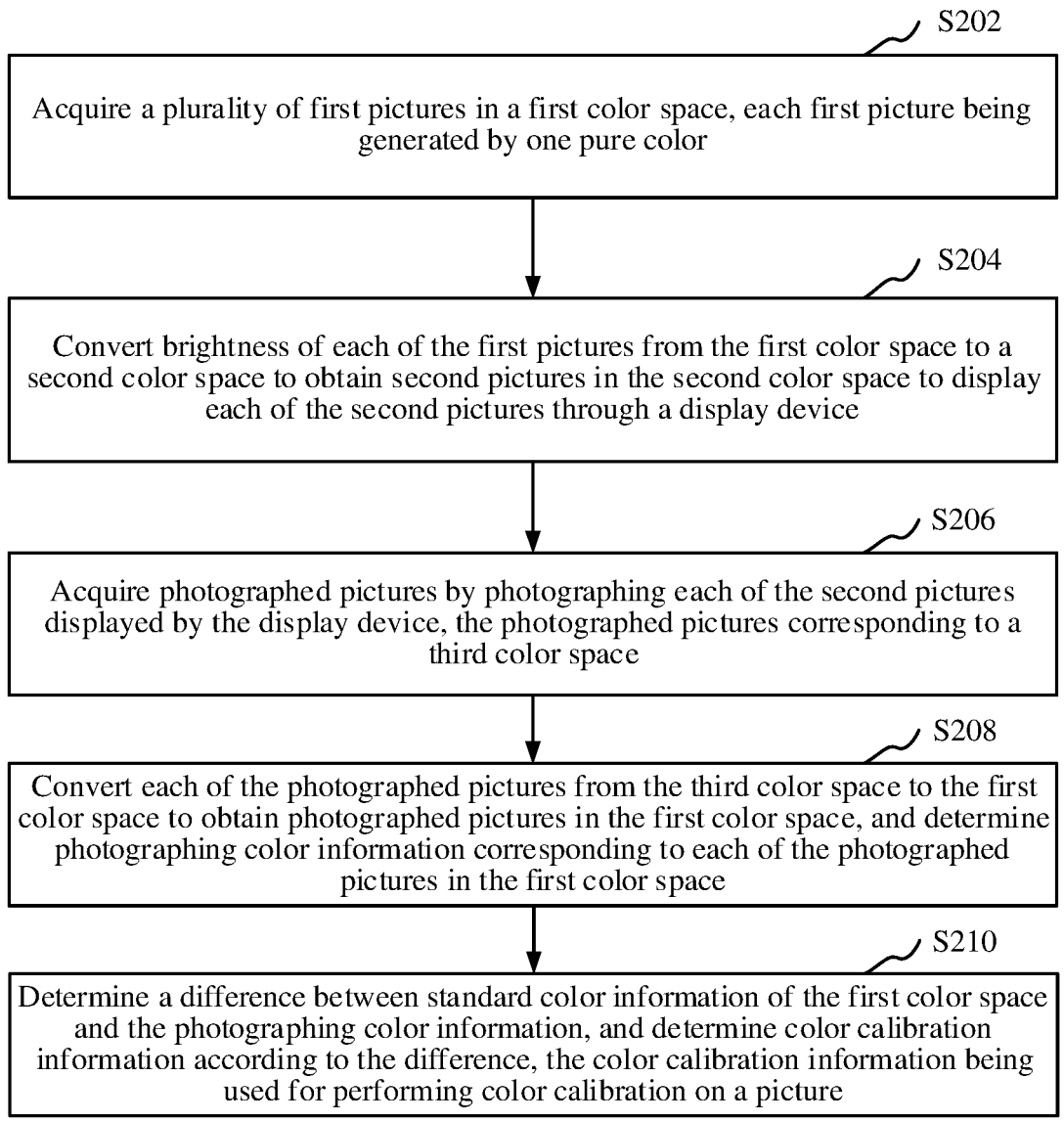
FIG. 2 is a flow schematic diagram of a color calibration method according to one embodiment of present disclosure.

In one embodiment, as shown in FIG. 2, a color calibration method is provided, and the method is illustrated as applied to a computer device (the computer device may be the terminal or the server in FIG. 1) in FIG. 1. The method includes the following steps.

Step S202: Acquire the plurality of first pictures in the first color space, each first picture being generated by one pure color.

The pure color refers to a single color, and may specifically be three primary colors and white composed of the three primary colors. The three primary colors refer to red, green, and blue.

Color is a different perception of light of different frequencies by the human eye. A color space, also referred to as "color gamut", refers to a range of colors that can be expressed by a certain color pattern. In chromatics, by establishing a plurality of color models, a certain color is expressed in one-dimensional, two-dimensional, three-dimensional, and even four-dimensional spatial coordinates. The color range that can be defined by a coordinate system is referred to as the color space. The color spaces include such as, but not limited to, a red green blue (RGB) color space, a CMYK color space, a Lab color space, and the like. The color models used in different devices may be different, and different devices display respective pictures through the respective used color spaces. A picture is a figure presented in a device, for example, a picture photographed by the terminal and a picture presented by the display device. The first picture is a picture presented through a color range defined by the first color space.

Specifically, the computer device may generate corresponding first pictures for different pure colors based on the first color space to obtain the first picture corresponding to each pure color.

In one embodiment, the terminal may generate the corresponding first picture for the pure color based on the first color space, and then the first picture is in the first color space. For different pure colors, the terminal generates a corresponding picture for each of the pure colors based on the first color space to obtain the first picture corresponding to each pure color.

Step S204: Convert the brightness of each of the first pictures from the first color space to the second color space to obtain the second pictures in the second color space to display each of the second pictures through the display device.

The second color space is different from the first color space. The second color space is a color space used when the display device presents color information of the picture, namely, the display device presents the color information of the picture through the second color space. The second picture is a picture presented through the second color space.

Hue, purity (also referred to as chroma, saturation), and lightness are referred to as three elements of color, namely, the color information includes the hue, purity, and lightness. The hue refers to a name of an appearance presented by the color, and can relatively accurately represent the name of a certain color, such as rose red, orange yellow, and lemon yellow. The purity of the color refers to the vividness or saturation of the color and represents a proportion of colored components contained in the color. The greater the proportion of the colored components, the higher the purity of the color, and the smaller the proportion of the colored components, the lower the purity of the color. The lightness refers to a degree of brightness of the color. Various colored objects produce the intensity of color due to a difference in the amount of light they reflect.

Specifically, the computer device needs to display the first picture corresponding to each pure color through the display device, and the display device needs to present the color information of the picture through the second color space.

The lightness defined by the first color space and the second color space is different, and when converting from the first color space to the second color space, the color information of the picture does not change, but brightness information of the picture changes. The color information of the picture refers to the hue and the purity of the color of the picture, and the brightness information refers to the lightness of the color of the picture.

The computer device converts the brightness of each first picture from the first color space to the second color space so as to redefine the brightness of each first picture through the second color space of the display device to obtain the brightness corresponding to each first picture in the second color space, and second pictures in the second color space may be obtained. The computer device displays each of the second pictures through the display device.

Step S206: Acquire photographed pictures by photographing each of the second pictures displayed by the display device, the photographed pictures corresponding to the third color space.

The third color space is different from the first color space and different from the second color space. The first color space, the second color space, and the third color space each represent different color ranges.

The third color space is a color space used when the photographing device presents the color information of the picture, namely, the photographing device presents the color information of the photographed picture through the third color space. The photographed picture corresponding to the third color space means that the photographed picture is a picture presented through the third color space, namely, the photographed picture is in the third color space.

Specifically, the computer device displays each of the second pictures through the display device and photographs each of the second pictures displayed by the display device through a camera to obtain corresponding photographed pictures. When the camera presents the color information of the photographed picture through the third color space, the camera corresponds to the third color space, and the picture photographed by the camera also corresponds to the third color space.

Step S208: Convert each of the photographed pictures from the third color space to the first color space to obtain photographed pictures in the first color space, and determine the photographing color information corresponding to each of the photographed pictures in the first color space.

Specifically, the computer device converts each of the photographed pictures from the third color space to the first color space so as to convert the color information corresponding to each of the photographed pictures from the third color space to the first color space to obtain the photographed pictures in the first color space and the photographing color information corresponding to each of the photographed pictures in the first color space.

Step S210: Determine the difference between the standard color information of the first color space and the photographing color information, and determine the color calibration information according to the difference, the color calibration information being used for performing color calibration on the picture to be calibrated.

Specifically, the standard color information is defined in the first color space and specifically includes at least one of standard red color information, standard green color information, standard blue color information, and standard white color information.

The computer device acquires the standard color information of the first color space and compares the standard color information with the photographing color information to determine the difference between the standard color information and the photographing color information. The computer device determines corresponding color calibration information based on the difference between the standard color information and the photographing color information. The color calibration information is used for performing color calibration on the picture to be calibrated to convert the calibrated picture into a picture that can be displayed by the display device so that the picture displayed by the display device is consistent in color with the picture to be calibrated.

In the embodiment, one pure color generates one first picture in the first color space. The plurality of first pictures are acquired, and the brightness of each of the first pictures is converted from the first color space to the second color space to obtain the second pictures in the second color space so that the display device can accurately present the color information of each of the second pictures, avoiding the color difference caused by the display device directly displaying the first picture. The photographed pictures by photographing each of the second pictures displayed by the display device are acquired, and the photographed pictures are in the third color space. Each of the photographed pictures is converted from the third color space to the first color space to obtain the photographed pictures in the first color space, and the photographing color information corresponding to each of the photographed pictures in the first color space is determined so that the color calibration information for performing the color calibration can be accurately determined based on the difference between the standard color information of the first color space and the photographing color information. The color calibration can be accurately performed on the picture to be calibrated through the color calibration information so that pictures displayed by different devices are consistent in color, thereby effectively reducing the color difference caused by displaying the pictures through different devices.

In one embodiment, converting the brightness of each of the first pictures from the first color space to the second color space to obtain the second pictures in the second color space to display each of the second pictures through the display device includes: encoding the brightness of each of the first pictures in the first color space to obtain encoded signals in the second color space; decode each of the encoded signals in the second color space to obtain the second pictures in the second color space; and displaying each of the second pictures through the display device.

Specifically, the computer device determines the brightness of each of the first pictures in the first color space and encodes the brightness so as to convert the same into the second color space to obtain encoded signals corresponding to each brightness in the first color space in the second color space. The computer device may decode each of the encoded signals to obtain the brightness in the second color space, and replace the brightness in each of the first pictures with a respective brightness in the second color space to obtain the second pictures in the second color space. The computer device may display each of the second pictures through the display device. Further, the computer device may transmit each of the second pictures in the second color space to the display device, and the display device receives and displays each of the second pictures.

In one embodiment, the display device may display each of the second pictures sequentially.

In the embodiment, the brightness of each of the first pictures in the first color space is encoded to obtain the encoded signals in the second color space so that each of the encoded signals is decoded in the second color space to obtain the second pictures in the second color space. Thus, the brightness can be converted from the first color space to the second color space by encoding and decoding the brightness information so that the brightness of the first picture is converted into the brightness that can be displayed within the color range of the display device. Therefore, the display device can accurately control the brightness of the displayed picture, and the display effect of the second picture displayed by the display device is consistent with that of the generated first picture, thereby avoiding a large color difference.

In one embodiment, acquiring the photographed pictures by photographing each of the second pictures displayed by the display device includes: photographing each of the second pictures displayed by the display device through the camera, and receiving the photographed pictures by the camera in real time, the camera corresponding to the third color space.

The camera may be a photographing device operating independently, or a camera installed in the terminal and operating depending on the terminal.

Specifically, the computer device may photograph each of the second pictures displayed by the display device through the camera and receive the photographed pictures by the camera in real time. When the camera presents the color information of the photographed picture through the third color space, the camera corresponds to the third color space, and the picture photographed by the camera corresponds to the third color space.

In one embodiment, the display device may sequentially display each of the second pictures, and each time the second picture is displayed, the computer device may photograph the displayed second picture through the camera to obtain a corresponding photographed picture. The photographed picture by photographing is transmitted to the computer device in real time.

In one embodiment, when the computer device is the terminal, the terminal may photograph each of the second pictures displayed by the display device through its camera and receive the photographed pictures by the camera in real time. Alternatively, the terminal may photograph each of the second pictures displayed by the display device through a camera of other devices and receive the photographed pictures by the camera in real time.

In one embodiment, the computer device may connect to the camera through a data line and transmit the pictures photographed by the camera through the data line in real time.

In the embodiment, the camera corresponds to the third color space. Each of the second pictures displayed by the display device is photographed by the camera, and the photographed pictures by the camera are received in real time to improve the processing efficiency.

In one embodiment, converting each of the photographed pictures from the third color space to the first color space to obtain the photographed pictures in the first color space and determining the photographing color information corresponding to each of the photographed pictures in the first color space includes: performing key point sampling on each of the photographed pictures to obtain key points corresponding to each of the photographed pictures; determining original color information about the key point of each of the photographed pictures, and for each of the photographed pictures, determining intermediate color information corresponding to the photographed picture based on the original color information about the key point corresponding to the photographed picture; and converting the intermediate color information into the first color space to obtain the photographed pictures in the first color space and the photographing color information corresponding to each of the photographed pictures in the first color space.

Specifically, for each of the photographed pictures, the computer device performs key point sampling on the photographed picture to collect a plurality of key points from the photographed picture to obtain a plurality of key points corresponding to each of the photographed pictures. The computer device determines the original color information of each key point in a respective photographed picture and calculates the intermediate color information corresponding to the photographed picture based on the original color information of the plurality of key points in the photographed picture.

The photographed picture presents the color information through the third color space, and the color information includes the color information, and then the original color information corresponding to the key point of the photographed picture is the color information presented through the third color space. The intermediate color information is determined based on the original color information of the key point, and then the intermediate color information also corresponds to the third color space. The computer device converts the intermediate color information from the third color space to the first color space to obtain corresponding photographing color information. In the same processing manner, the computer device may obtain the photographing color information corresponding to each of the photographed pictures.

In one embodiment, for each of the photographed pictures, determining the intermediate color information corresponding to the photographed picture based on the original color information about the key point of the photographed picture includes: for each of the photographed pictures, averaging the original color information about the key points of the photographed pictures to obtain average value information about the color corresponding to each of the photographed pictures, and taking the average value information about the color corresponding to the photographed picture as the intermediate color information of the photographed picture.

In the embodiment, the key point sampling is performed on each of the photographed pictures to obtain the key points corresponding to each of the photographed pictures. The original color information about the key points of each of the photographed pictures is determined. For each of the photographed pictures, the intermediate color information corresponding to each of the photographed pictures is determined based on the original color information about the key points corresponding to the respective photographed picture. It is more reliable to determine the intermediate color information about the photographed picture through the color information about a plurality of collected key points, avoiding a lack of universality of processing results caused by single data. The intermediate color information is converted into the first color space to obtain the photographed pictures in the first color space and the photographing color information corresponding to each of the photographed pictures in the first color space so that the color calibration information capable of calibrating the photographing color information into the standard color information is accurately determined based on the difference between the photographing color information of the first color space and the standard color information of the first color space.

In one embodiment, performing the key point sampling on each of the photographed pictures to obtain the key points corresponding to each of the photographed pictures includes: determining a center point of each of the photographed pictures; performing sampling in a plurality of directions of each center point to obtain sampling points; and taking each of the center points and each of the sampling points as the key points corresponding to a respective photographed picture.

Specifically, the computer device may determine the center point of the photographed picture, and the center point is the key point in a center position of the photographed picture. The computer device may determine a plurality of directions with the center point as an origin point in the photographed picture and perform sampling in the plurality of directions to obtain at least one corresponding sampling point in each direction. Further, the computer device may determine a plurality of scattering directions with the center point as the origin point in the photographed picture and collect at least one point in each scattering direction to obtain sampling points in each scattering direction.

The computer device takes the center point of the photographed picture and the corresponding sampling points in each direction as the key points corresponding to the photographed picture.

In one embodiment, a plurality of directions corresponding to the center point of each of the photographed pictures are the same, for example, the center point of each photographed picture corresponds to 8 scattering directions, such as a due north direction, a due east direction, and a north-south 45-degree direction of the center point, but not limited thereto.

In the embodiment, the center point of each of the photographed pictures is determined, and the sampling is performed in the plurality of directions with each center point as the origin point to obtain the sampling points in different directions so as to ensure the consistency of each of the sampling points in the direction dimension. Each of the center points and each of the sampling points are taken as the key points corresponding to the respective photographed picture so that the color information of the plurality of collected key points is more reliable, and the result obtained by using the original color information of the plurality of key points for subsequent processing is also more reliable, effectively avoiding the problem that the color information of a single key point is not accurate resulting in the inaccuracy of the finally determined color calibration information.

In one embodiment, converting the intermediate color information into the first color space to obtain the photographed pictures in the first color space and the photographing color information corresponding to each of the photographed pictures in the first color space includes: performing brightness conversion on the intermediate color information to obtain intermediate color information of which the brightness is of a linear type; and performing color conversion on the intermediate color information of which the brightness is of the linear type to obtain the photographed pictures in the first color space and the photographing color information corresponding to each of the photographed pictures in the first color space.

Specifically, the brightness corresponding to the intermediate color information is of an original type, and the brightness of the original type is used for storage and data transmission. However, in actual processing, when the brightness of the linear type is used for a picture display, participating in calculation processing, etc. the computer device needs to convert the brightness of the intermediate color information from the original type to the linear type.

The original type and the linear type are two different expressions of brightness. The original type may be a storage format corresponding to the brightness when the picture is stored, and the linear type may be a display format of the brightness of the picture when the picture is displayed. The brightness of the original type refers to a value corresponding to the brightness in a certain storage format when the picture is stored, for example, a value corresponding to the brightness being stored in an 8-bit integer format. The brightness of the linear type is the actual brightness that the picture presents when it is displayed.

The computer device determines the brightness corresponding to the intermediate color information and performs the brightness conversion on each brightness to convert the brightness from the original type to the linear type so as to obtain the intermediate color information of which the brightness is the linear type.

The photographed picture corresponds to the color information presented by the third color space, and the original color information corresponding to the key point of the photographed picture is the color information in the third color space. The intermediate color information is determined based on the original color information of the key point, and then the intermediate color information is also in the third color space. The computer device performs the color conversion on the intermediate color information of which the brightness is of the linear type to convert the intermediate color information from the third color space to the first color space to obtain the photographed pictures in the first color space and the photographing color information corresponding to each of the photographed pictures in the first color space. The photographing color information is the color information in the first color space, and the brightness of the photographing color is of the linear type.

It is to be understood that the color information does not change when the brightness conversion is performed. The brightness does not change when the color conversion is performed.

In the embodiment, performing the brightness conversion on the intermediate color information to obtain the intermediate color information of which the brightness is of the linear type can convert the brightness in the storage format into the brightness that can be used for data calculation.

The color conversion is performed on the intermediate color information of which the brightness is of the linear type to convert the intermediate color information from the third color space to the first color space to accurately obtain the photographing color information corresponding to each of the photographed pictures in the first color space. The brightness conversion is performed first and then the color conversion is performed on brightness-converted color information so that data of the third color space can be accurately mapped to the first color space.

In one embodiment, performing the brightness conversion on the intermediate color information to obtain intermediate color information of which the brightness is of the linear type includes: acquiring a brightness mapping relationship, the brightness mapping relationship representing the conversion relationship between the original type and the linear type of brightness; and converting the brightness of the intermediate color information from the original type to the linear type through the brightness mapping relationship to obtain the intermediate color information of which the brightness is of the linear type.

Specifically, the conversion relationship between the brightness of different types is stored in the computer device, for example the conversion relationship between the original type and the linear type. The conversion relationship between the original type and the linear type is referred to as the brightness mapping relationship. The brightness of the original type is used for storage and data transmission, and the brightness of the linear type is used for an actual picture display and participating in calculation processing.

The computer device may determine the brightness corresponding to the intermediate color information, and the brightness corresponding to the intermediate color information is of the original type. The computer device needs to convert the brightness of the original type into the linear type to use the brightness of the linear type for participating in the determination of the color calibration information. The computer device may acquire the brightness mapping relationship and convert each piece of the intermediate color information through the brightness mapping relationship so as to convert the brightness of the intermediate color information from the original type to the linear type and obtain the intermediate color information of which the brightness is of the linear type.

In the embodiment, the brightness mapping relationship represents the conversion relationship between the original type and the linear type of brightness. The brightness of the intermediate color information can be converted from the original type to the linear type through the brightness mapping relationship to convert the brightness in the storage format into the brightness that can be used for data calculation so that the brightness of the intermediate color information can be used for participating in the calculation, thereby more accurately determining the color calibration information in combination with the brightness dimension.

In one embodiment, the method further includes: calibrating a virtual scene picture in the first color space through the color calibration information to obtain a calibration picture; converting the brightness of the calibration picture from the first color space to the second color space to obtain the virtual display picture in the second color space to display the virtual display picture converted to the second color space through the display device; acquiring a fused picture by photographing the virtual display picture and a real scene simultaneously, the fused picture being in the third color space; and converting the fused picture from the third color space to the first color space to obtain a target scene picture.

In the embodiment, the virtual scene picture in the first color space is calibrated through the calibration information to obtain the calibration picture. The brightness of the calibration picture is converted from the first color space to the second color space to obtain the virtual display picture in the second color space to display the virtual display picture converted to the second color space through the display device. The fused picture by photographing the virtual display picture and the real scene simultaneously is acquired, and the fused picture is in the third color space. The fused picture is converted from the third color space to the first color space to obtain the target scene picture so that pictures displayed by different devices can be consistent in color, thereby effectively reducing the color difference caused by displaying the pictures through different devices.

Figure 3:
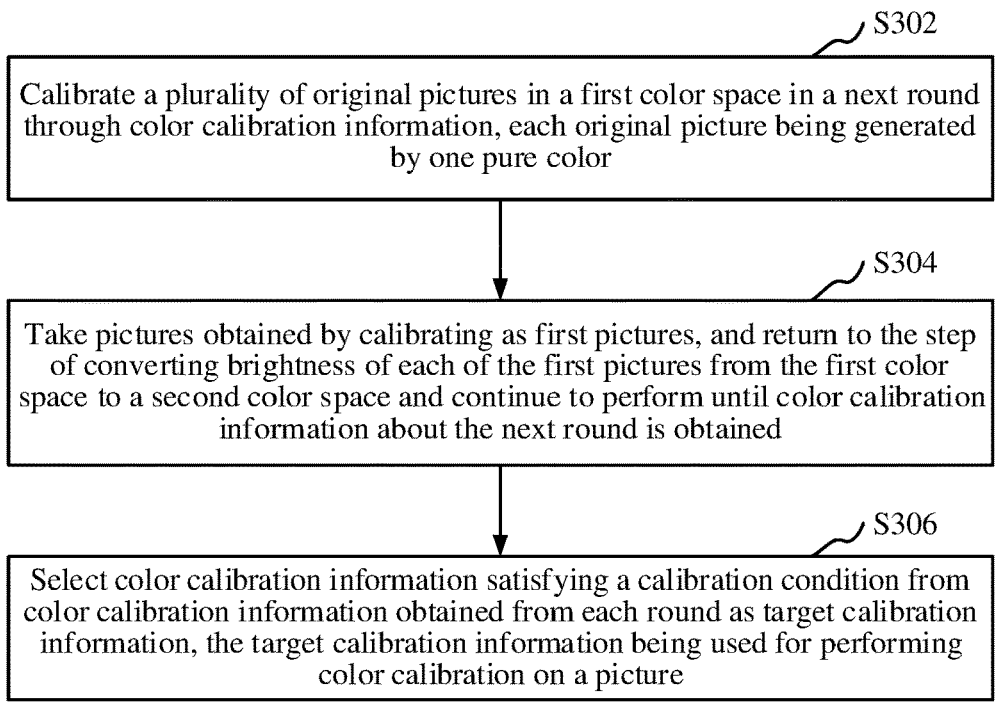
FIG. 3 is a flow schematic diagram of a step of selecting color calibration information satisfying a calibration condition as target calibration information according to one embodiment of present disclosure.

In one embodiment, as shown in FIG. 3, the method further includes the following steps.

Step S302: Calibrate a plurality of original pictures in the first color space in a next round through the color calibration information, each original picture being generated by one pure color.

Specifically, after the computer device determines the color calibration information, it proceeds to a next round of processing. In the next round, the computer device generates corresponding original pictures for different pure colors based on the first color space to obtain the original picture corresponding to each pure color. The computer device may calibrate each of the original pictures through the color calibration information to obtain the calibrated pictures.

Step S304: Take a picture obtained by calibrating as the first picture, and return to the step of converting brightness of each of the first pictures from the first color space to a second color space and continue to perform until color calibration information about the next round is obtained.

Specifically, the computer device takes the pictures obtained by calibrating as the first pictures and converts the brightness of each of the first pictures from the first color space to the second color space to obtain the second pictures in the second color space to display each of the second pictures through the display device. The computer device acquires the photographed pictures by photographing each of the second pictures displayed by the display device, and the photographed pictures correspond to the third color space. The computer device converts each of the photographed pictures from the third color space to the first color space to obtain the photographed pictures in the first color space and determines the photographing color information corresponding to each of the photographed pictures in the first color space. The computer device determines the difference between the standard color information of the first color space and the photographing color information and determines the color calibration information according to the difference so that color calibration information about the next round may be obtained. In the same processing manner, the computer device may obtain the color calibration information determined separately in each round.

It is to be understood that the specific processing process for determining the color calibration information may refer to the processing of the embodiments described above.

In one embodiment, the computer device may stop when a preset number of iteration rounds has been reached, obtaining a preset number of color calibration information.

Step S306: Select color calibration information satisfying a calibration condition from color calibration information obtained from each round as target calibration information, the target calibration information being used for performing the color calibration on the picture to be calibrated.

The calibration condition may be such that the difference between the photographing color information of the photographed picture in the first color space and the standard color information in the first color space is less than a difference threshold, or color calibration information which minimizes the difference between the photographing color information of the photographed picture in the first color space and the standard color information in the first color space is selected from a plurality of color calibration information.

Specifically, the computer device acquires a preset calibration condition, matches the color calibration information obtained in each round with the calibration condition to select the color calibration information satisfying the calibration condition, and takes the color calibration information satisfying the calibration condition as the target calibration information.

In the embodiment, the computer device may calibrate the original pictures generated based on each pure color using the color calibration information about each round. The computer device takes the pictures obtained by calibrating as the first pictures and converts the brightness of each of the first pictures from the first color space to the second color space to obtain the second pictures in the second color space to display each of the second pictures through the display device. The photographed pictures by photographing each of the second pictures displayed by the display device are acquired, and the photographed pictures correspond to the third color space. Each of the photographed pictures is converted from the third color space to the first color space to obtain the photographed pictures in the first color space and the photographing color information corresponding to each of the photographed pictures in the first color space. The computer device calculates the difference between the standard color information of the first color space and the photographing color information and obtains the difference corresponding to the color calibration information about each round. The computer device may select color calibration information corresponding to the minimum difference from the differences as the target calibration information.

Alternatively, the computer device calculates the difference between the standard color information of the first color space and the photographing color information and obtains the difference corresponding to the color calibration information about each round. Each difference is compared with the difference threshold, and the color calibration information less than the difference threshold is selected as the target calibration information.

The target calibration information is used for performing the color calibration on the picture to be calibrated to perform the color space conversion after the picture to be calibrated is calibrated so that after the camera photographs the picture displayed by the display device, the photographed picture obtained is consistent in color with the picture to be calibrated, avoiding significant color differences caused by the display of different devices.

In the embodiment, original pictures generated based on each pure color in the next round are calibrated through the color calibration information to readjust the color information of the original pictures. The picture obtained by calibrating is taken as the first picture, and returns to the step of converting the brightness of each of the first pictures from the first color space to the second color space and continues to perform until the color calibration information about the next round is obtained to determine whether the difference between the photographing color information obtained based on the processing of a series of different devices after calibrating and the standard color information is reduced. The color calibration information satisfying the calibration condition is selected from the color calibration information obtained from each round as the target calibration information so that color calibration information that makes the difference between the photographing color information and the standard color information small or minimal can be selected as final calibration information, and the selected target calibration information is more accurate. The target calibration information is used for performing the color calibration on the picture to be calibrated to perform color space conversion on the calibrated picture so that after the camera photographs the picture displayed by the display device, the photographed picture obtained is consistent in color with the picture to be calibrated, avoiding significant color differences caused by the display of different devices.

Figure 4:
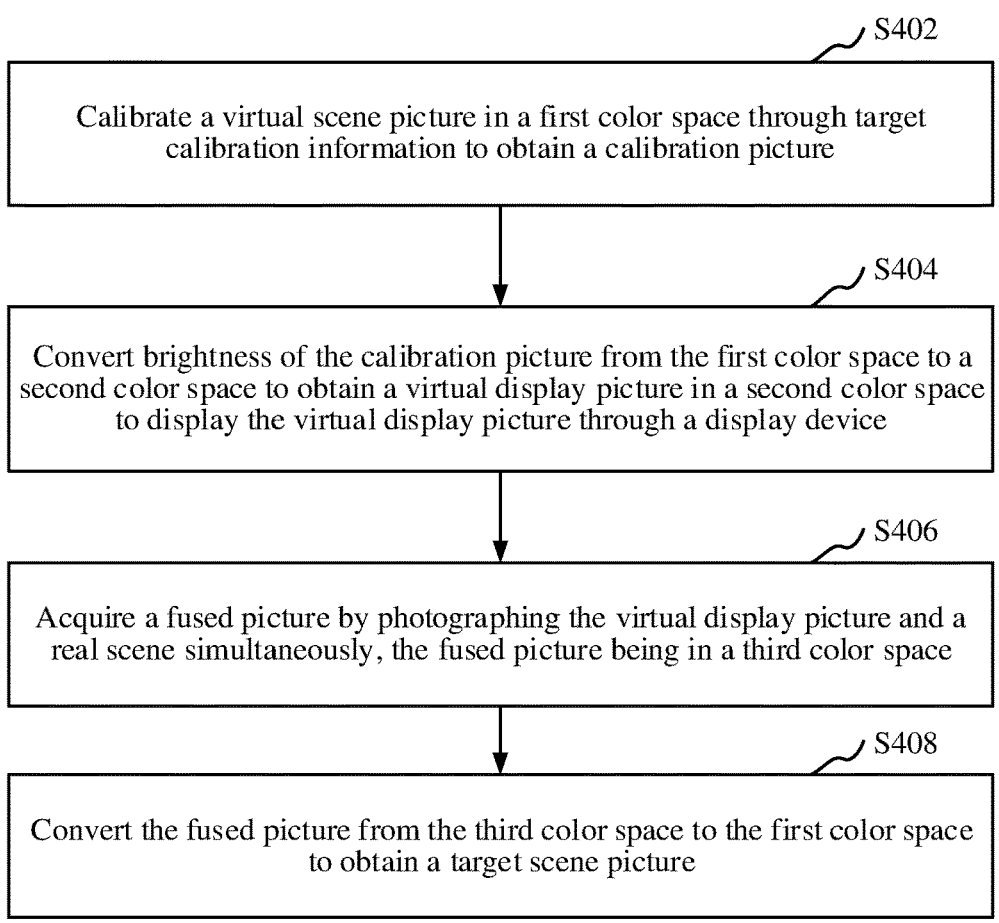
FIG. 4 is a flow schematic diagram of a color calibration method according to another embodiment of present disclosure.

In one embodiment, as shown in FIG. 4, the picture to be calibrated is the virtual scene picture, and the method further includes the following steps.

Step S402: Calibrate a virtual scene picture in the first color space through the target calibration information to obtain a calibration picture.

Specifically, the picture to be calibrated is a picture presenting the color information through the first color space. The first color space refers to a certain preset color range, and the picture to be calibrated is a picture presenting the color information through a certain predefined color range. The picture to be calibrated is the virtual scene picture, namely, the virtual scene picture is the picture presenting the color information through the first color space. The computer device may calibrate the virtual scene picture through the target calibration information to obtain the calibration picture. Further, the computer device may determine the color information corresponding to the virtual scene picture and calibrate the color information of the virtual scene picture through the target calibration information to obtain the calibration picture. For example, the target calibration information is represented by a calibration coefficient, and the color information of the virtual scene picture is represented by a color value. Each color value of the virtual scene picture and the calibration coefficient are multiplied, and color values obtained after the multiplication are used to replace the respective color values in the virtual scene picture to obtain the calibration picture.

Step S404: Convert brightness of the calibration picture from the first color space to the second color space to obtain a virtual display picture in the second color space to display the virtual display picture through the display device.

Specifically, the computer device needs to display the calibration picture through the display device and the display device needs to present the color information of the picture through the second color space. The brightness of the calibration picture needs to be converted from the first color space to the second color space to obtain the virtual display picture in the second color space.

The computer device converts the brightness of the calibration picture from the first color space to the second color space to redefine the brightness of the calibration picture through the second color space of the display device, obtaining the brightness corresponding to the calibration picture in the second color space. By replacing the brightness of the calibration picture in the first color space with the corresponding brightness of the calibration picture in the second color space, the virtual display picture may be obtained. The computer device displays the virtual display picture through the display device.

Step S406: Acquire a fused picture by photographing the virtual display picture and a real scene simultaneously, the fused picture being in the third color space.

Specifically, the computer device displays the virtual display picture through the display device, and the display device is presented in a real scene. The computer device photographs the display device and the real scene simultaneously through the camera to obtain the fused picture. When the camera presents the color information of the photographed picture through the third color space, the camera corresponds to the third color space, and the fused picture photographed by the camera is in the third color space.

In the embodiment, a scene formed by taking the virtual display picture as a background and the real scene as a foreground is photographed by the camera to obtain the fused picture in the third color space.

Step S408: Convert the fused picture from the third color space to the first color space to obtain a target scene picture.

Specifically, the computer device converts the fused picture from the third color space to the first color space to convert the color information corresponding to the fused picture from the third color space to the first color space to obtain photographing color information corresponding to the fused picture in the first color space. The computer device replaces the color information in the fused picture with the corresponding photographing color information in the first color space, and the target scene picture may be obtained.

In the embodiment, the virtual scene picture in the first color space is calibrated through the target calibration information to obtain the calibration picture. The brightness of the calibration picture is converted from the first color space to the second color space to obtain the virtual display picture in the second color space to display the virtual display picture converted to the second color space through the display device. The fused picture by photographing the virtual display picture and the real scene simultaneously is acquired, and the fused picture is in the third color space.

The fused picture is converted from the third color space to the first color space to obtain the target scene picture so that pictures displayed by different devices can be consistent in color, thereby effectively reducing the color difference caused by displaying the pictures through different devices.

In one embodiment, the real scene includes a real scene prop. Acquiring the fused picture by photographing the virtual display picture and the real scene simultaneously includes: photographing, through the camera, the scene formed by taking the virtual display picture as the background and the real scene prop as the foreground to obtain the fused picture.

The real scene prop is a real prop and a physical prop in the real scene.

Specifically, the computer device presents the virtual display picture through the display device and places the real scene prop in front of the virtual display picture presented by the display device to form the scene taking the virtual display picture as the background and the real scene prop as the foreground. The computer device photographs the scene through the camera to obtain the fused picture in the third color space.

In the embodiment, the camera captures the scenes formed by taking the virtual display picture as the background and the real scene prop as the foreground simultaneously to generate the fused picture so that the real scene prop and the virtual picture can exist in the same picture and space simultaneously after being fused, thereby skillfully combining virtual information and a real environment.

In one embodiment, various pure colors include red, green, blue, and white; the first color space is a standard red green blue (sRGB) color space; the second color space is a perceptual quantizer (PQ) color space; the display device is a light-emitting diode (LED) display screen; the third color space is a color space corresponding to the camera for photographing each of the second pictures; and the standard color information includes relevant information about standard red, standard green, standard blue, and standard white in the sRGB color space.

Specifically, each pure color includes red, green, blue, and white; the first color space is the sRGB color space, the second color space is the PQ color space, and the display device is the LED display screen. The third color space is the color space corresponding to the camera for photographing each of the second pictures, and it may be a logarithmic color space, such as a LogC color space. The standard color information includes the relevant information about standard red, standard green, standard blue, and standard white in the sRGB color space.

The computer device acquires first pictures generated based on red, green, blue, and white, each of the first pictures being in the first color space, and converts the brightness of each of the first pictures from the first color space to the second color space to obtain the second pictures in the second color space. Second pictures corresponding to red, green, blue, and white are displayed through the display device. Photographed pictures by photographing the second pictures corresponding to red, green, blue, and white displayed on the LED display screen are acquired to obtain photographed pictures corresponding to red, green, blue, and white, and the photographed pictures are in a third color space; Each of the photographed pictures is converted from the third color space to the first color space to obtain the photographing color information corresponding to each of the photographed pictures in the first color space, i.e., obtaining the photographing color information corresponding to red, green, blue, and white. Based on the difference between the photographing color information corresponding to red and the color information corresponding to standard red, the difference between the photographing color information corresponding to green and the color information corresponding to standard green, the difference between the photographing color information corresponding to blue and the color information corresponding to standard blue, and the difference between the photographing color information corresponding to white and the color information corresponding to standard white, the color calibration information that calibrates red, green, blue, and white as standard red, standard green, standard blue, and standard white can be determined.

It is to be understood that the specific process of converting the color space and determining the color calibration information for pictures corresponding to red, green, blue, and white may refer to the processing of the embodiments described above.

In the embodiment, the first pictures generated based on red, green, blue, and white are acquired, and the brightness of the first pictures corresponding to red, green, blue, and white is converted from the first color space to the second color space to obtain the second pictures in the second color space so that the LED screen can accurately present the color information of each of the second pictures, avoiding the color difference caused by the LED screen directly displaying the first picture. The second pictures corresponding to red, green, blue, and white displayed on the LED screen are photographed by the camera to obtain corresponding photographed pictures. Each of the photographed pictures is converted from the third color space to the first color space to obtain the photographing color information corresponding to red, green, blue, and white in the first color space so that based on the difference between the photographing color information corresponding to red, green, blue, and white and the standard red, green, blue, and white in the first color space, the color calibration information that calibrates red, green, blue, and white as standard red, standard green, standard blue, and standard white can be determined. Thus, through the color calibration information, the color calibration can be accurately performed on red, green, blue, and white in the picture and other colors composed of these several colors so that the color difference caused by different devices, such as the terminal, the LED screen, and the camera, is exactly offset, and pictures displayed by different devices are consistent in color, thereby effectively reducing the color difference caused by displaying the pictures through different devices.

In one embodiment, a color calibration method is provided. The terminal may be the computer, the display device is the LED screen, and the camera includes any type of cameras.

(1) The computer outputs four colors of red, green, blue, and white.

The color space used by the computer to present the color information is the sRGB, and the computer outputs four pure colors of red, green, blue, and white in the sRGB color space to obtain sRGB pictures generated by each pure color.

The sRGB encoding function is defined as follows:

$$V = \begin{cases} L \times 12.92 & L \leq 0.0031308 \\ 1.055 \times L^{\frac{1}{2.4}} - 0.055 & L > 0.0031308 \end{cases}$$

L is image brightness normalized in a range of 0-1 and is actual brightness when the image is displayed. V is the resulting encoded signal, namely, V is a value corresponding to the actual brightness stored in the 8-bit integer format. An sRGB encoded signal is typically stored as an 8-bit integer, namely, round (V*255). L is linear data used for displaying, and V is used for storing the brightness.

An sRGB decoding function is defined as follows:

$$L = \begin{cases} \dfrac{12.92}{L} & L < 0.004045 \\ (\dfrac{V + 0.055}{1.055})^{2.4} & L \geq 0.004045 \end{cases}$$

Figure 5:
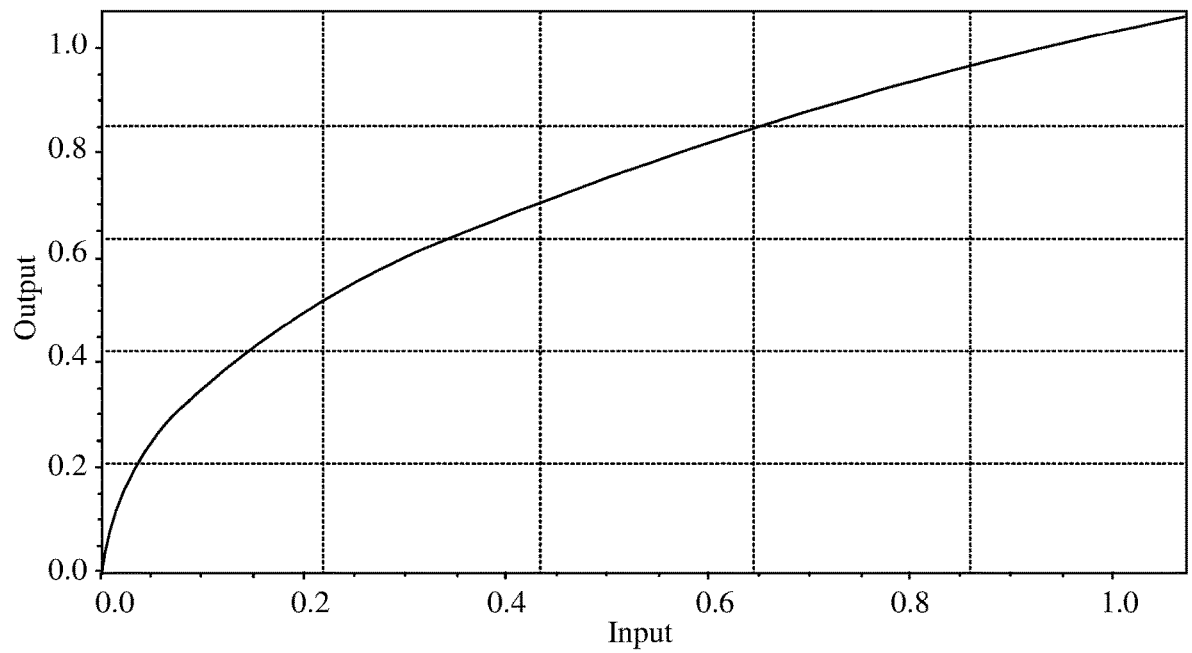
FIG. 5 is a schematic diagram of a brightness conversion curve of a sRGB color space according to one embodiment of present disclosure.

A brightness conversion curve of the sRGB is shown in FIG. 5. The brightness conversion curve of the sRGB defines changes in brightness in a standard dynamic range (sdr) display.

(2) The led screen requires data set to the PQ color space to display the color information, i.e., converting the sRGB color space to the PQ color space.

It is necessary to project computer-generated sRGB pictures to the led screen to control the brightness of each lamp bead in the led screen so as to display each sRGB picture through the led screen, and therefore it is necessary to convert the brightness of the computer-generated sRGB picture into the PQ color space.

A PQ conversion formula is as follows:

$$L = 10000 \times (\dfrac{\max(V^{1/m_2} - c_1, 0)}{c_2 - c_3 \times V^{1/m_2}})^{1/m_1}$$

$m_1 = 2610/16384$, $m_2 = 2523/4096 \times 128$, $c_1 = 3424/4096$, $c_2 = 2431/4096 \times 32$, and $c_3 = 2392/4096 \times 32$.

Figure 6:
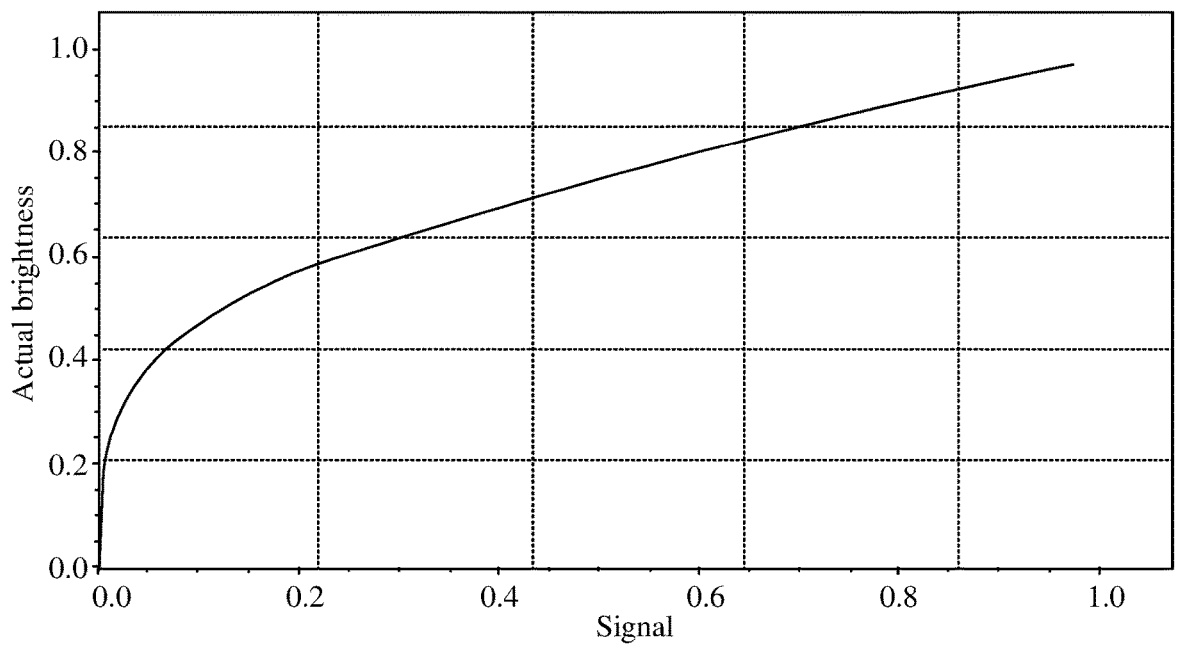
FIG. 6 is a schematic diagram of a PQ curve according to one embodiment of present disclosure.

A PQ curve is shown in FIG. 6. The PQ curve defines how values of a displayer from 0.0001 to 10000 candelas per square meter (cd/m2) are allocated in an interval of 0 to 1 to control the actual brightness of the LED display screen through the PQ color space.

Brightness information of the sRGB picture can be converted into the brightness information in the PQ color space through the PQ conversion formula so that display content generated by the brightness information in the PQ color space is displayed on the LED screen. The image brightness L of the sRGB is converted into a corresponding V in the PQ color space, the V in the PQ color space is converted into a corresponding L in the PQ color space, and the corresponding L in the PQ color space is displayed on the LED screen.

The purpose of converting the brightness information of the sRGB picture into the PQ color space is: ordinary sRGB data can only express 0-1 range space during transmission, which is one SDR color space, while an actual brightness change is actually very large. After conversion to the PQ color, it may obtain a maximum brightness range color information which may be expressed to 10000 nits, greatly increasing the actual display effect. At the same time, a color space which can specifically express the brightness information of the screen is obtained, and the change of the PQ space can be linearly reflected in the brightness of the screen.

(3) The camera is used to photograph the picture displayed by the LED screen, and photographed picture data is recorded in a raw format.

The display content of the led screen is photographed by the camera, and the photographed picture is transmitted to the computer in real time through the data line to obtain a photographed picture in a real-time RAW format. Different cameras have different data recording formats. Taking an arri camera as an example, the data recorded by the arri camera is the raw format of the logc, which may be used for changing the color through curve information and color gamut information corresponding to the logc.

An encoding equation for the LogC curve is as follows:

$$V = \begin{cases} c \times \log_{10}(a \times L + b) + d & L > \text{cut} \\ e \times L + f & L \leq \text{cut} \end{cases}$$

cut=0.010591, a=5.555556, c=0.247190, d=0.385537, e=5.367655, and f=0.092809.

A decoding equation for the LogC curve is as follows:

$$L = \begin{cases} \dfrac{(10^{(V-d)/c} - b)}{a} & L > e \times \text{cut} + f \\ \dfrac{V - f}{e} & V \leq e \times \text{cut} + f \end{cases}$$

(4) The RAW format data is connected in real time to the computer through the data line and a collection card.

The computer receives the real-time raw data of the camera, and needs to parse the data to reduce the same to data in the sRGB color space. The real-time raw data may be reduced to the data in the sRGB color space through the above-mentioned encoding and decoding formula. That is, the photographed picture in the RAW format is converted into the sRGB color space to obtain a corresponding photographing color in the sRGB color space. The raw data is data information before a photoreceptor operates to generate an image.

Specifically, a center point in a photographed picture of the real-time RAW format and 8 sampling points in 8 directions of the center point are collected to obtain color values of 9 sampling points. The color values of the 9 sampling points are weighted and averaged to obtain an average value. According to the same processing manner, four corresponding average values of red, green, blue, and white are obtained. The brightness V of a color value in the RAW format is converted into linear brightness L, and at this time, the color value will not change during brightness conversion. The four corresponding average values of red, green, blue, and white in the linear brightness L are multiplied by a color conversion matrix to obtain color values of red, green, blue, and white in the sRGB color space, namely, obtaining photographing colors in the sRGB color space.

A conversion matrix between the LogC and the sRGB can be preset. The reduction of the raw data to the data of the sRGB color space needs to consider two things, one is the conversion of the brightness curve and the other is the conversion of the color. Both the LogC and the sRGB define the coordinates of each red, green, blue, and white point in an XYZ color space, and the color conversion matrix of the two color spaces may be calculated through four coordinates in each of the two color spaces.

Figure 7:
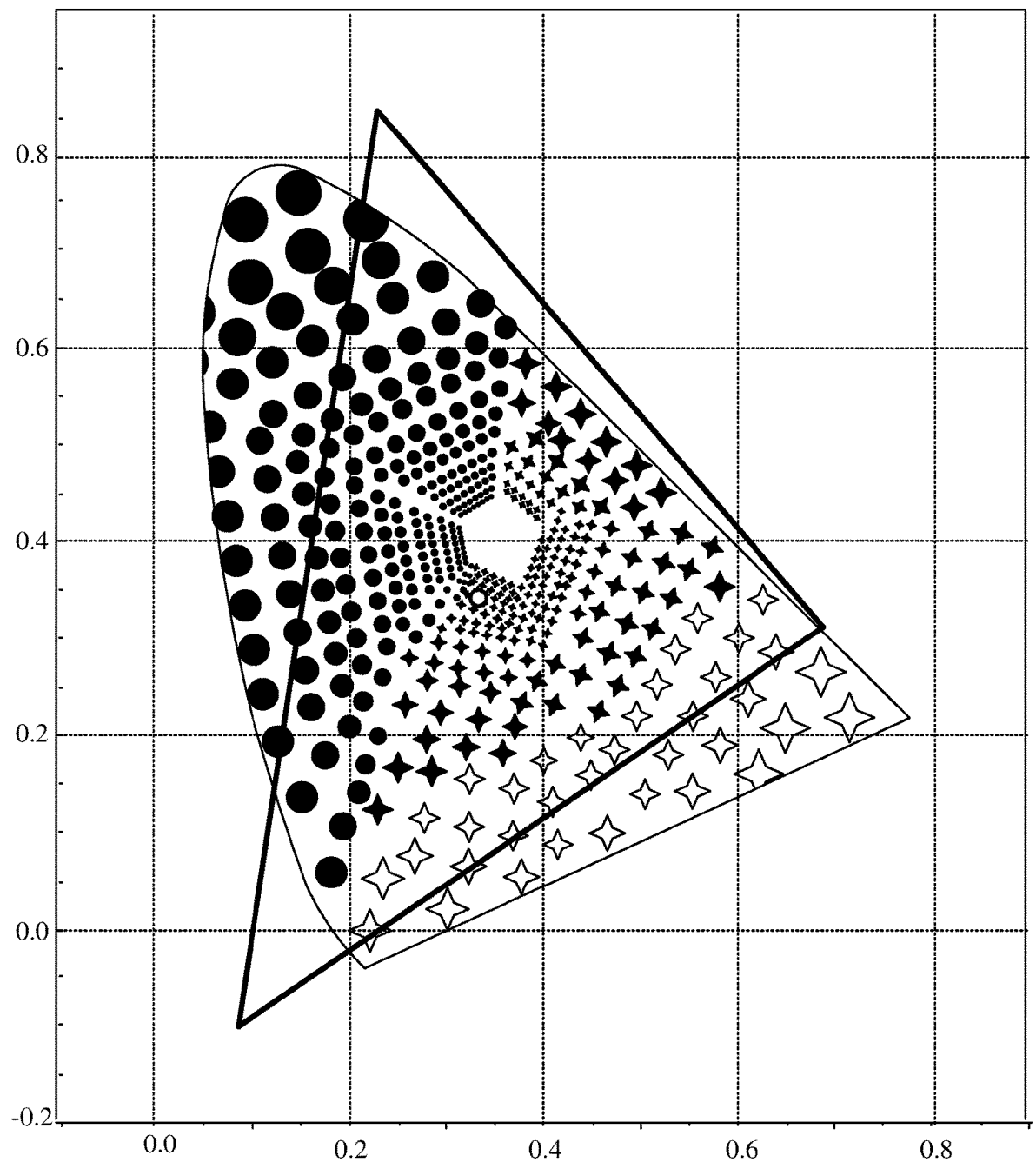
FIG. 7 is a schematic diagram of a logc color space according to one embodiment of present disclosure.

As shown in FIG. 7, it is a wide color gamut corresponding to ALEXA and the coordinates corresponding to standard red, green, blue, and white in the logc color space. Dots and asterisks in the figure may represent different colors. Smaller dots and asterisks represent a lighter color, and closer dots and asterisks represent more of the same components as in the other color. Endpoints of the triangle are the coordinates corresponding to red, green, and blue, such as red (0.6840, 0.3130), green (0.2210, 0.8480), and blue (0.0861, −0.1020). A white circle represents the coordinate corresponding to white, such as white [0.3127, 0.3290 (D65)].

Figure 8:
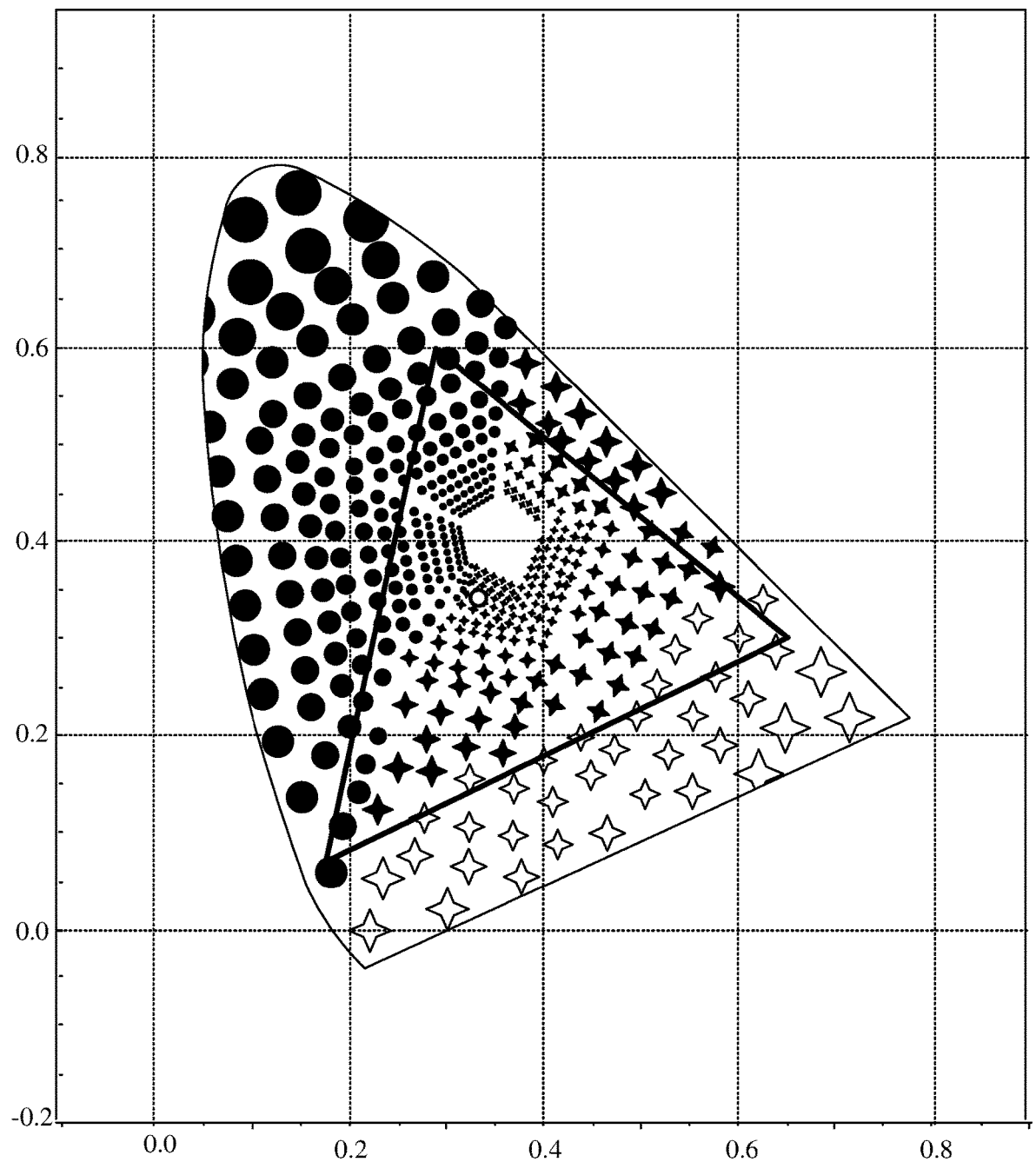
FIG. 8 is a schematic diagram of a sRGB color space according to one embodiment of present disclosure.

As shown in FIG. 8, it is a wide color gamut corresponding to Recently.709, i.e., the sRGB color space, and the coordinates corresponding to standard red, green, blue, and white in the sRGB color space. Such as red (0.640, 0.330), green (0.300, 0.600), blue (0.150, 0.060), and white [0.3127, 0.3290 (D65)].

A logc-srgb color conversion matrix may be calculated through the coordinates of red, green, blue, and white points in FIG. 7 and FIG. 8, and the logc-srgb color conversion matrix is:

[1.61747146, −0.53724802, −0.08022302
−0.07057393, 1.33458262, −0.26400745
−0.02110524, −0.22698252, 1.24808776]

After the curve information and the (logc-srgb) color conversion matrix are obtained, the color conversion may be performed on the data obtained in real time by photographing to obtain photographing color information in the srgb space.

(5) The difference between the photographing color and a target color is calculated to obtain the color calibration matrix.

The standard colors in the sRGB color space are acquired, namely, standard red, standard green, standard blue, and standard white. The difference between the photographing color and the target color is calculated to obtain the color calibration matrix. That is, a 3×3 matrix F is created from the corresponding data under the sRGB color space obtained after the conversion of pure color such as red, green, and blue:

$$F = \begin{bmatrix} R_R & G_R & B_R \\ R_G & G_G & B_G \\ R_B & G_B & B_B \end{bmatrix}$$

I=F$^{-1}$, S=I×W/max(WRGB),
SR=I*WR/max(WRGB), SG=I*WG/max(WRGB), and SB=I*WB/max(WRGB).
W represents white, W=[WR, WG, WB], and max (WRGB) represents the maximum value in [WR, WG, WB].

The matrix F is scaled using a calculated scaling coefficient S to obtain a matrix F1, and then an inverse matrix of the matrix F1 is calculated. The matrix CalibrationMX is the color calibration matrix, as follows:

$$F1 = \begin{bmatrix} S_R & 0 & 0 \\ 0 & S_G & 0 \\ 0 & 0 & S_B \end{bmatrix} \times F$$

CalibrationMX=F1−1

(6) Selection of color calibration matrix

Color matrices are superimposed on a computer-outputted picture, and step 1 to step 6 are automatically circulated many times to reduce an error. A color calibration matrix that corresponds to the photographing color closest to the standard color is selected as the final color calibration matrix. The resulting color calibration matrix is the color calibration matrix used for the original material.

Before (2) converting the sRGB color space to the PQ color space, the four colors of red, green, blue, and white outputted by the computer in (1) are multiplied by the color calibration matrix for calibration. The sRGB color space is converted to the PQ color space after the calibration, and continues to perform. The process of 1 to 6 may be repeated 3 times to obtain a more accurate color calibration matrix.

(7) Application of color calibration matrix

The final color calibration matrix is taken as the target calibration matrix, namely, the target calibration information. Since red, blue, green, and white are calibrated, the photographing color information is consistent with the color information outputted by the computer. Therefore, all the other colors composed of these four colors can also be consistent with the color information outputted by the computer through the calibration of the target calibration information.

When the target calibration matrix is multiplied by the output picture of the computer, the display picture of the LED screen and the real scene prop placed in front of the LED screen are simultaneously photographed by the camera and displayed by the LED screen to generate the original material and derive the same. The computer performs the color space conversion on the derived original material to obtain a corresponding photographing color in the sRGB color space so as to obtain target material.

Figure 9:
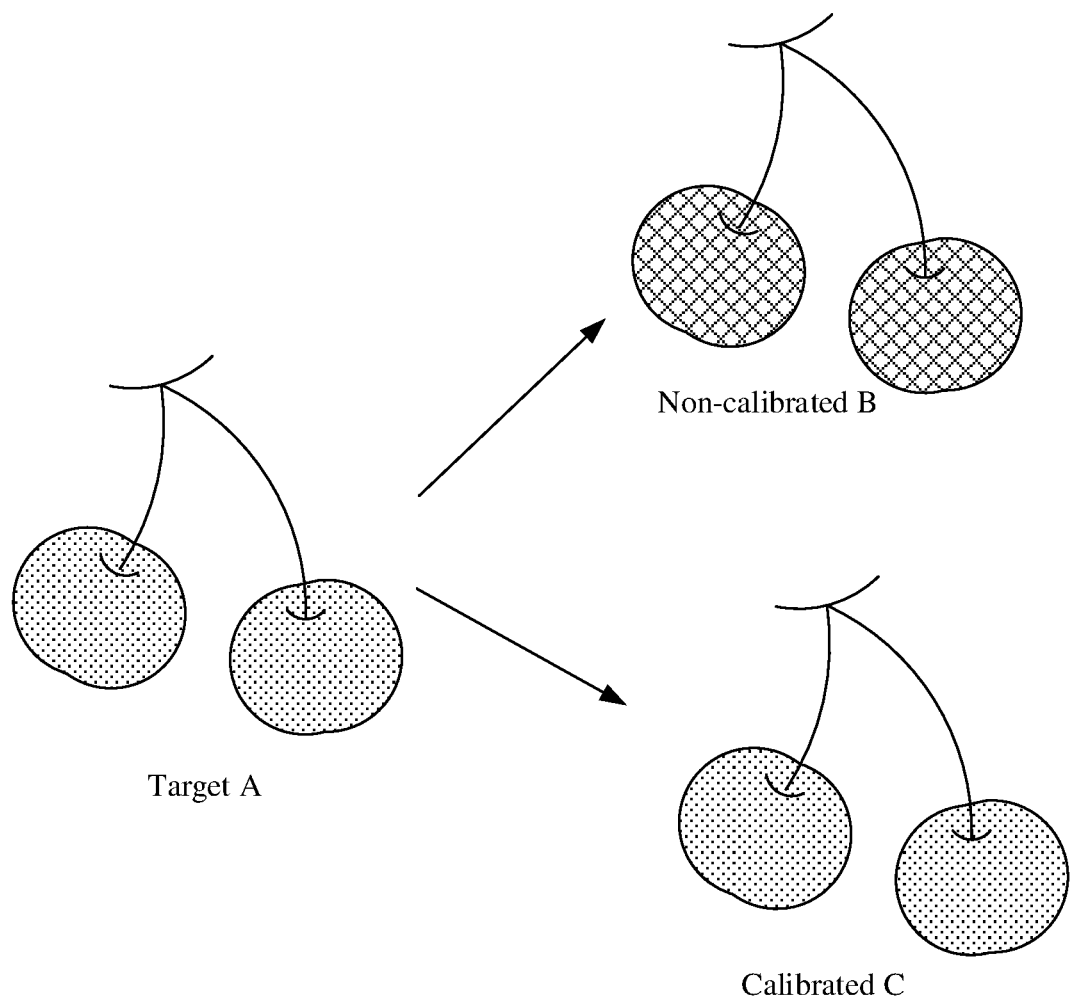
FIG. 9 is a diagram showing a comparison between a photographed picture obtained when a target color picture is calibrated and a photographed picture obtained when the target color picture is not calibrated according to one embodiment of present disclosure.

As shown in FIG. 9, a target A is color information presented by a target color picture in the computer, and the target calibration matrix is [1.40454, −0.00453979, 0.0659411, 0; −0.082085, 1.05607, −0.0145155, 0; −0.0388996, 0.0335672, 1.15484; 0, 0, 0, 0, 1]

When the target color picture is not calibrated, the photographed picture displayed through the LED screen and photographed through the arri camera is non-calibrated B.

The target color picture is displayed through the target calibration matrix, and the photographed picture displayed through the LED screen and photographed through the arri camera is calibrated C. The arri camera photographs with an aperture of 22, an iso of 800, and a white balance of 6500. It can be seen from FIG. 9 that after the target color picture is calibrated, the color of the photographed picture photographed by the camera can be consistent with the color of the target color picture, namely, color differences caused by different devices can be avoided through the color calibration.

In the embodiment, the data can be calibrated quickly in real time, and the accuracy of the calibration can be further improved by iterating the data. In addition, for adjusting different white balance pairs for a live camera, as long as a color calibration matrix is calculated, a color of an original led screen under the white balance can be quickly reduced. The embodiment is directed to the conversion of the color space in the logc format stored by the arri camera, while different camera storage formats may have different color spaces. When different cameras are used, different color space conversion matrices and curves may be replaced, and different pairs of cameras may be calibrated. Common cameras are also SLog from sony, CLog from Canon, proTune from GoPro, V-Log from Panasonic, log 3G10 from RED, etc.

The color calibration method in the embodiment may be applied to a virtual film production scene, and the required devices include a computer equipped with a game engine, the LED screen, a set decoration, and a live camera. Virtual film production refers to a series of computer-aided film production and visual film production methods. The game engine refers to the core components of some compiled editable computer game systems or some interactive real-time image application programs. The LED screen refers to a large LED screen in a virtual film production photographing site for displaying the virtual content generated by the game engine. The set decoration refers to the physical props set in front of the LED screen. The live camera refers to the live camera in the virtual film production, which will capture a fused picture of the LED screen and the set decoration simultaneously. When the color calibration method in the embodiment is applied to the virtual film production scene, four colors of red, green, blue, and white may be outputted by the game engine in the computer, and the above-mentioned step (1) to step (6) are performed to obtain the target calibration matrix. It is to be understood that the camera used in the virtual film production scene processing is the live camera.

After obtaining the target calibration matrix, the computer outputs a game scene picture generated by the game engine and calibrates the game scene picture through the target calibration matrix to obtain a calibration picture, where the game scene picture and the calibration picture correspond to the sRGB color space.

The computer transmits the calibration picture to the LED screen, and the LED screen converts the brightness of the calibration picture from the sRGB color space to the PQ color space and displays a virtual display picture converted to the PQ color space.

The live camera captures the virtual display picture and the set decoration simultaneously to generate a corresponding fused picture. The fused picture corresponds to the third color space used by the live camera, and the specific type of the third color space is determined by the live camera. The color spaces used by different cameras may be different.

It is to be understood that when there are multiple frames of the game scene pictures generated by the game engine, processing may be performed according to the above-mentioned steps to obtain the fused picture corresponding to each frame of the game scene pictures. The set decoration corresponding to the virtual display picture of each frame of the game scene pictures may be different and may be specifically set according to requirements.

The live camera may derive the fused pictures to the computer, and the computer converts the fused pictures being derived from the third color space to the sRGB color space to correspondingly obtain target game pictures. A target game video is generated based on the fusion of the target game pictures.

Alternatively, the live camera may derive the fused pictures as the original material and then perform the color space conversion on the original material to convert the same into the sRGB color space, thereby generating the target game video based on the fusion of the target game pictures obtained after the conversion.

In the embodiment, the virtual film production is an area where the real world blends with the digital world, and virtual reality and augmented reality are combined with computer generation image (CGI) and game engine technology to enable producers to see scenes presented in front of them as if these scenes were composed and photographed in real scenes. In the photographing site of the virtual film production scene, the LED screen is configured to display the virtual content, and an actual furnishing prop is placed in front of the LED screen. The live camera through the virtual film production scene can capture the fused picture of the LED screen and the set decoration simultaneously, thereby generating a video combining virtual and real, such as the game video.

The traditional virtual film production scene does not pay attention to the game scene picture generated by the game engine of the computer, the game scene picture being displayed on the display screen, and a difference in the color range when the camera photographing the content displayed on the display screen, namely, not paying attention to the difference in the color range of the generated picture and the display picture caused by different devices using different color spaces so that a serious color distortion occurs on a finally generated picture or video.

However, in the embodiment, respective pictures generated by red, green, blue, and white generated by the game engine are displayed on the LED screen after the color space conversion to obtain corresponding photographed pictures by the live camera, thereby obtaining corresponding photographing color information. Based on the difference between the photographing color information corresponding to red, green, blue, and white in the first color space and standard red, green, blue, and white of the first color space, the target calibration information that calibrates red, green, blue, and white as standard red, standard green, standard blue, and standard white is accurately determined so that the color calibration can be performed on red, green, blue, and white in the picture through the target calibration information. In addition, the other colors may all be composed of red, green, blue, and white, and the color calibration may also be effectively performed on the other colors composed of these colors through the target calibration information so that the color difference caused by different devices, such as the computer game engine, the LED screen, and the live camera, is exactly offset.

The game scene picture generated by the game engine is calibrated in real time and rapidly through the target calibration matrix to be displayed through the LED screen after the color space conversion is performed so that the game scene picture is included in the fused picture generated by capturing the picture displayed by the LED screen and the set decoration through the live camera, and the color of the game scene picture included in the fused picture is consistent with the color of the game scene picture generated by the game engine. Namely, by calibrating the color of the LED screen, the photographed picture of the live camera can be consistent in color with an input picture of the LED screen (the input picture is the picture generated by the game engine), avoiding the color difference generated by different devices.

In addition, the fused pictures by photographing through the live camera are first derived, and then the color space conversion is performed. The problem that the resolution of the original material decreases due to the limited amount of transmitted data when data is directly transmitted can be avoided by deriving the original material first so that the quality of the generated target game video is high.

Figure 10:
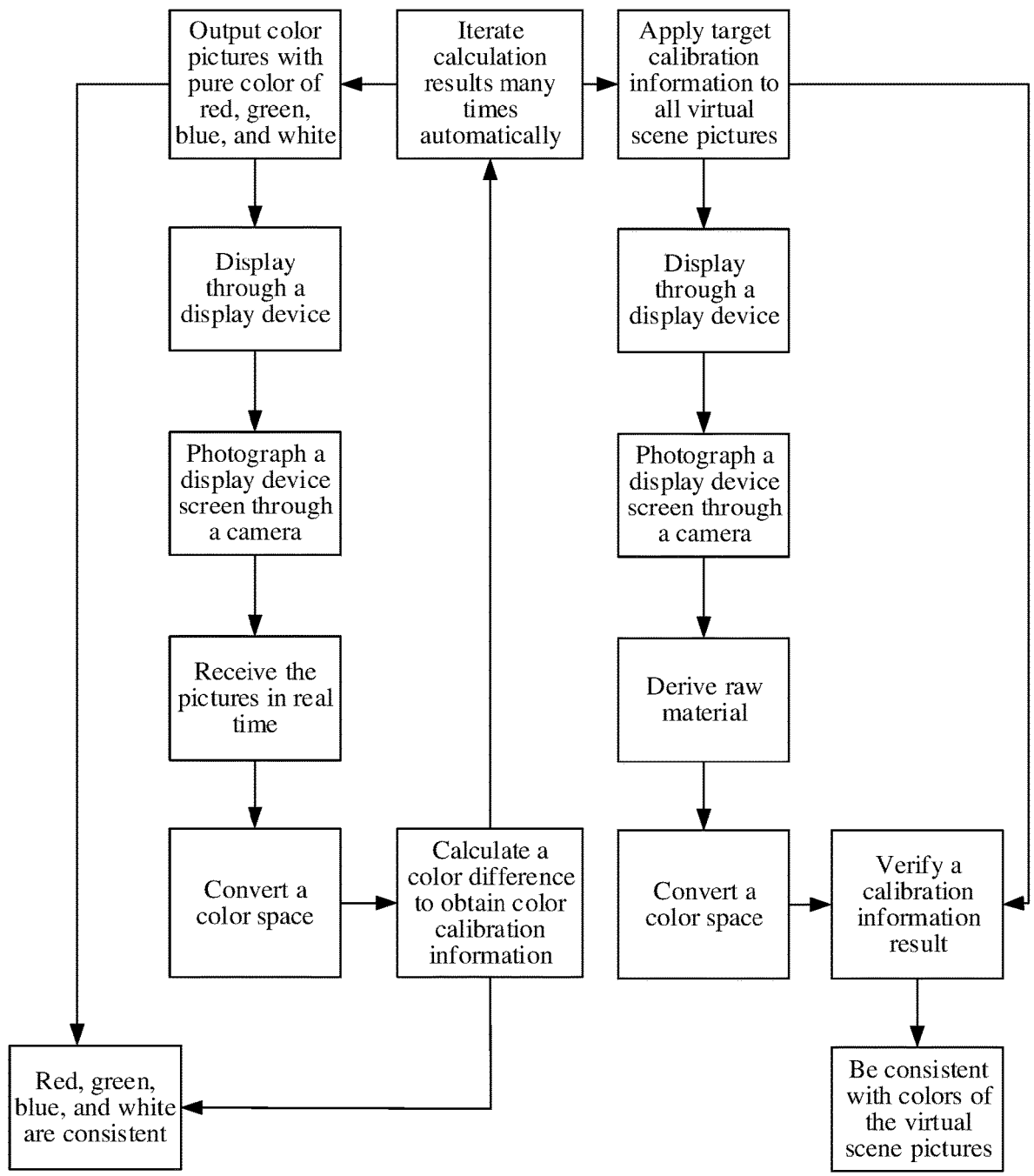
FIG. 10 is a flow schematic diagram of a color calibration method according to another embodiment of present disclosure.

In one embodiment, as shown in FIG. 10, a color calibration method is provided, including the following steps.

The terminal is in the plurality of first pictures in the first color space, each first picture being generated by one pure color.

The terminal transmits each of the first pictures to the display device, the display device corresponding to the second color space.

The display device converts the brightness of each of the first pictures from the first color space to the second color space, namely, encoding the brightness of each of the first pictures in the first color space to obtain encoded signals in the second color space. Each of the encoded signals in the second color space is decoded to obtain the second pictures in the second color space.

The display device sequentially displays each of the second pictures.

The camera photographs each of the second pictures displayed sequentially by the display device and transmits the photographed picture photographed by the camera to the terminal in real time through the data line, where the camera and the photographed picture correspond to the third color space.

The terminal determines the center point of each of the photographed pictures and performs sampling in the plurality of directions with each center point as the origin point to obtain sampling points. Each of the center points and each of the sampling points are taken as the key points corresponding to the respective photographed picture.

For each of the photographed pictures, the terminal determines the intermediate color information corresponding to each of the photographed pictures based on the original color information about the key points corresponding to the respective photographed picture.

Further, the terminal performs the brightness conversion on the intermediate color information to obtain the intermediate color information of which the brightness is of the linear type, and acquires the brightness mapping relationship, the brightness mapping relationship representing the conversion relationship between the original type and the linear type of brightness. The brightness of the intermediate color information is converted from the original type to the linear type through the brightness mapping relationship to obtain the intermediate color information of which the brightness is of the linear type.

Further, the terminal performs the color conversion on the intermediate color information of which the brightness is of the linear type to obtain the photographing color information corresponding to each of the photographed pictures in the first color space.

Next, the terminal determines the difference between the standard color information of the first color space and the photographing color information and determines the color calibration information based on the difference. The color calibration information can calibrate the photographing color information as the standard color information.

Next, the terminal calibrates the plurality of original pictures in the first color space in the next round through the color calibration information, each original picture being generated by one pure color.

Further, the terminal takes the picture obtained by calibrating as the first picture and returns to the step of converting the brightness of each of the first pictures from the first color space to the second color space and continues to perform until the color calibration information about the next round is obtained.

Next, the terminal selects the color calibration information satisfying the calibration condition from the color calibration information obtained from each round as the target calibration information, Next, the terminal calibrates the virtual scene picture in the first color space through the target calibration information to obtain the calibration picture.

Further, the terminal transmits the calibration picture to the display device. The display device converts the brightness of the calibration picture from the first color space to the second color space and displays the virtual display picture converted to the second color space.

Next, the camera photographs the scene formed by taking the virtual display picture as the background and the real scene prop as the foreground to obtain the fused picture, and the fused picture is in the third color space.

Further, the terminal converts the fused picture from the third color space to the first color space to obtain the target scene picture.

In the embodiment, one pure color generates one first picture in the first color space. The plurality of first pictures are acquired, and the brightness of each of the first pictures is converted from the first color space to the second color space to obtain the second pictures in the second color space so that the display device can accurately present the color information of each of the second pictures, avoiding the color difference caused by the display device directly displaying the first picture. The photographed pictures by photographing each of the second pictures displayed by the display device are acquired, and the photographed pictures correspond to the third color space. Each of the photographed pictures is converted from the third color space to the first color space to obtain the photographed pictures in the first color space, and the photographing color information corresponding to each of the photographed pictures in the first color space is determined so that the color calibration information for performing the color calibration can be accurately determined based on the difference between the standard color information of the first color space and the photographing color information. The color calibration can be accurately performed on the picture to be calibrated through the color calibration information so that pictures displayed by different devices are consistent in color, thereby effectively reducing the color difference caused by displaying the pictures through different devices. In the case of lossless color, the photographing color information corresponding to each pure color is completely consistent with the standard color information. When different devices present the color information using different color spaces, the same picture displayed in different devices may have different colors. The color difference between the photographing color information corresponding to each pure color and the standard color information is the color difference existing between different devices. The color calibration information determined based on the color difference between the photographing color information and the standard color information can accurately calibrate the photographing color information corresponding to the pure color as the standard color information, and other colors composed of a plurality of pure colors can all be calibrated through the color calibration information so that the color information about the picture photographed by the camera is consistent with that of the first picture.

The original pictures generated based on each pure color in the next round are calibrated through the color calibration information to readjust the color information of the original pictures. The picture obtained by calibrating is taken as the first picture, and returns to the step of converting the brightness of each of the first pictures from the first color space to the second color space and continues to perform until the color calibration information about the next round is obtained to determine whether the difference between the photographing color information obtained based on the processing of a series of different devices after calibrating and the standard color information is reduced. The color calibration information satisfying the calibration condition is selected from the color calibration information obtained from each round as the target calibration information so that color calibration information that makes the difference between the photographing color information and the standard color information small or minimal can be selected as final calibration information, and the selected target calibration information is more accurate.

The virtual scene picture is calibrated through the target calibration information to obtain the calibration picture in the first color space. The brightness of the calibration picture is converted from the first color space to the second color space to display the virtual display picture converted to the second color space through the display device. The camera captures the virtual display picture and the real scene prop placed in front of the virtual display picture simultaneously to generate the fused picture in the third color space. The fused picture is converted from the third color space to the first color space to obtain the target scene picture so that the color information about the virtual scene picture existing in the fused picture photographed by the camera is consistent with that of the virtual scene picture outputted by the terminal, that is, the color information about the virtual scene picture existing in the fused picture is the same as that of an uncalibrated virtual scene picture so that pictures displayed by different devices can be consistent in color, thereby effectively reducing the color difference caused by displaying the pictures through different devices.

In addition, the camera captures the virtual display picture and the real scene prop placed in front of the virtual display picture simultaneously to generate the fused picture so that the real scene prop and the virtual picture can exist in the same picture and space simultaneously after being fused, thereby skillfully combining the virtual information and the real environment to obtain an image or video combining virtual and real.

It is to be understood that the steps in the flowchart involved in the embodiments above are shown sequentially as indicated by the arrows, the steps are not necessarily performed in order as indicated by the arrows. The steps are performed in no strict order unless explicitly stated herein, and the steps may be performed in other orders. Furthermore, at least some of the steps in the flowchart involved in the embodiments above may include a plurality of steps or a plurality of stages, which are not necessarily performed at the same time but may be performed at different times, and the order in which the steps or stages are performed may not necessarily be sequential, but may be performed alternately or interchangeably with other steps or at least part of steps or stages within other steps.

Based on the same inventive concept, embodiments of the present disclosure also provide a color calibration apparatus for implementing the above-mentioned color calibration method. The solution to the problem provided by the apparatus is similar to the solution described in the above method so that the specific definitions provided below in one or more embodiments of the color calibration apparatus may be referred to above for the definition of the color calibration method.

Figure 11:
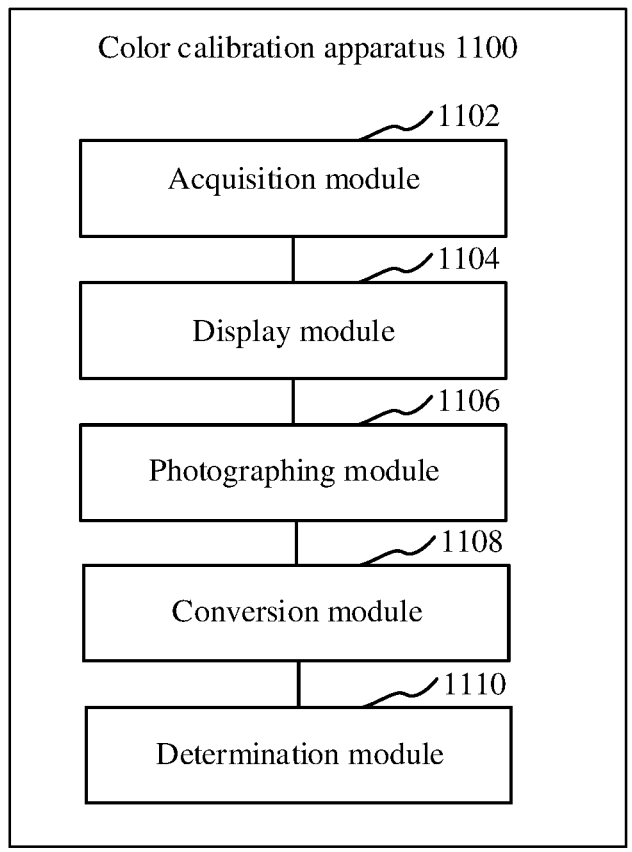
FIG. 11 is a block structural diagram of a color calibration apparatus according to one embodiment of present disclosure.

In one embodiment, as shown in FIG. 11, a color calibration apparatus 1100 is provided, including: an acquisition module 1102, a display module 1104, a photographing module 1106, a conversion module 1108, and a determination module 1110.

The acquisition module 1102 is configured to acquire the plurality of first pictures in the first color space, each first picture being generated by one pure color.

The display module 1104 is configured to convert the brightness of each of the first pictures from the first color space to the second color space to obtain the second pictures in the second color space to display each of the second pictures through the display device.

The photographing module 1106 is configured to acquire the photographed pictures by photographing each of the second pictures displayed by the display device, the photographed pictures corresponding to the third color space.

The conversion module 1108 is configured to convert each of the photographed pictures from the third color space to the first color space to obtain the photographed pictures in the first color space, and determine the photographing color information corresponding to each of the photographed pictures in the first color space.

The determination module 1110 is configured to determine the difference between the standard color information of the first color space and the photographing color information and determine the color calibration information according to the difference, the color calibration information being used for performing color calibration on the picture to be calibrated.

In the embodiment, one pure color generates one first picture in the first color space. The plurality of first pictures are acquired, the first picture corresponds to the first color space, and the brightness of each of the first pictures is converted from the first color space to the second color space to obtain the second pictures in the second color space so that the display device can accurately present the color information of each of the second pictures, avoiding the color difference caused by the display device directly displaying the first picture. The photographed pictures by photographing each of the second pictures displayed by the display device are acquired, and the photographed pictures are in the third color space. Each of the photographed pictures is converted from the third color space to the first color space to obtain the photographed pictures in the first color space, and the photographing color information corresponding to each of the photographed pictures in the first color space is determined so that the color calibration information can be accurately determined based on the difference between the standard color information of the first color space and the photographing color information. The color calibration can be accurately performed on the picture to be calibrated through the color calibration information so that pictures displayed by different devices are consistent in color, thereby effectively reducing the color difference caused by displaying the pictures through different devices.

In one embodiment, the display module 1104 is further configured to encode the brightness of each of the first pictures in the first color space to obtain encoded signals in the second color space; decode each of the encoded signals in the second color space to obtain the second pictures in the second color space; and display each of the second pictures through the display device.

In the embodiment, the brightness of each of the first pictures in the first color space is encoded to obtain the encoded signals in the second color space so that each of the encoded signals is decoded in the second color space to obtain the second pictures in the second color space. Thus, the brightness can be converted from the first color space to the second color space by encoding and decoding the brightness information so that the brightness of the first picture is converted into the brightness that can be displayed within the color range of the display device. Therefore, the display device can accurately control the brightness of the displayed picture, and the display effect of the second picture displayed by the display device is consistent with that of the generated first picture, thereby avoiding a large color difference.

In one embodiment, the photographing module 1106 is further configured to photograph each of the second pictures displayed by the display device through the camera and receive the photographed pictures by the camera in real time, the camera corresponding to the third color space.

In the embodiment, the camera corresponds to the third color space. Each of the second pictures displayed by the display device is photographed by the camera, and the photographed pictures by the camera are received in real time to improve the processing efficiency.

In one embodiment, the conversion module 1108 is further configured to perform key point sampling on each of the photographed pictures to obtain the key points corresponding to each of the photographed pictures; determine the original color information about the key point of each of the photographed pictures, and for each of the photographed pictures, determine the intermediate color information corresponding to the photographed picture based on the original color information about the key point of the photographed picture; and convert the intermediate color information into the first color space to obtain the photographed pictures in the first color space and the photographing color information corresponding to each of the photographed pictures in the first color space.

In the embodiment, the key point sampling is performed on each of the photographed pictures to obtain the key points corresponding to each of the photographed pictures. The original color information about the key points of each of the photographed pictures is determined. For each of the photographed pictures, the intermediate color information corresponding to each of the photographed pictures is determined based on the original color information about the key points corresponding to the respective photographed picture. It is more reliable to determine the intermediate color information about the photographed picture through the color information about a plurality of collected key points, avoiding a lack of universality of processing results caused by single data. The intermediate color information is converted into the first color space to obtain the photographed pictures in the first color space and the photographing color information corresponding to each of the photographed pictures in the first color space so that the color calibration information capable of calibrating the photographing color information into the standard color information is accurately determined based on the difference between the photographing color information of the first color space and the standard color information of the first color space.

In one embodiment, the conversion module 1108 is further configured to determine the center point of each of the photographed pictures; perform sampling in a plurality of directions of each center point to obtain sampling points; and take each of the center points and each of the sampling points as the key points corresponding to a respective photographed picture.

In the embodiment, the center point of each of the photographed pictures is determined, and the sampling is performed in the plurality of directions with each center point as the origin point to obtain the sampling points in different directions so as to ensure the consistency of each of the sampling points in the direction dimension. Each of the center points and each of the sampling points are taken as the key points corresponding to the respective photographed picture so that the color information of the plurality of collected key points is more reliable, and the result obtained by using the original color information of the plurality of key points for subsequent processing is also more reliable, effectively avoiding the problem that the color information of a single key point is not accurate resulting in the inaccuracy of the finally determined color calibration information.

In one embodiment, the conversion module 1108 is further configured to perform the brightness conversion on the intermediate color information to obtain the intermediate color information of which the brightness is of the linear type; perform color conversion on the intermediate color information of which the brightness is of the linear type to obtain the photographed pictures in the first color space and the photographing color information corresponding to each of the photographed pictures in the first color space.

In the embodiment, performing the brightness conversion on the intermediate color information to obtain the intermediate color information of which the brightness is of the linear type can convert the brightness in the storage format into the brightness that can be used for data calculation.

The color conversion is performed on the intermediate color information of which the brightness is of the linear type to convert the intermediate color information from the third color space to the first color space to accurately obtain the photographing color information corresponding to each of the photographed pictures in the first color space in the first color space. The brightness conversion is performed first and then the color conversion is performed on brightness-converted color information so that data of the third color space can be accurately mapped to the first color space.

In one embodiment, the conversion module 1108 is further configured to acquire the brightness mapping relationship, the brightness mapping relationship representing the conversion relationship between the original type and the linear type of brightness; convert the brightness of the intermediate color information from the original type to the linear type through the brightness mapping relationship to obtain the intermediate color information of which the brightness is of the linear type.

In the embodiment, the brightness mapping relationship represents the conversion relationship between the original type and the linear type of brightness. The brightness of the intermediate color information can be converted from the original type to the linear type through the brightness mapping relationship to convert the brightness in the storage format into the brightness that can be used for data calculation so that the brightness of the intermediate color information can be used for participating in the calculation, thereby more accurately determining the color calibration information in combination with the brightness dimension.

Figure 12:
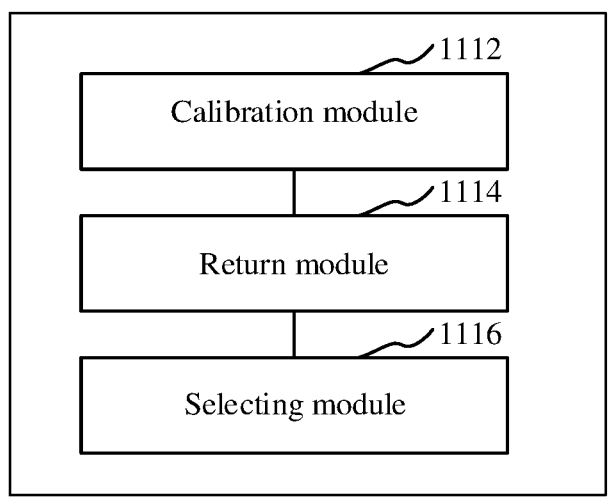
FIG. 12 is a block structural diagram of a color calibration apparatus according to another embodiment of present disclosure.

In one embodiment, as shown in FIG. 12, the apparatus further includes a calibration module 1112, a return module 1114, and a selecting module 1116.

The calibration module 1112 is configured to calibrate the plurality of original pictures in the first color space in the next round through the color calibration information, each original picture being generated by one pure color.

The return module 1114 is configured to take the picture obtained by calibrating as the first picture, and return to the step of converting the brightness of each of the first pictures from the first color space to the second color space and continue to perform until the color calibration information about the next round is obtained.

The selecting module 1116 is configured to select the color calibration information satisfying the calibration condition from the color calibration information obtained from each round as the target calibration information, the target calibration information being used for performing the color calibration on the picture to be calibrated.

In the embodiment, original pictures generated based on each pure color in the next round are calibrated through the color calibration information to readjust the color information of the original pictures. The picture obtained by calibrating is taken as the first picture, and returns to the step of converting the brightness of each of the first pictures from the first color space to the second color space and continues to perform until the color calibration information about the next round is obtained to determine whether the difference between the photographing color information obtained based on the processing of a series of different devices after calibrating and the standard color information is reduced. The color calibration information satisfying the calibration condition is selected from the color calibration information obtained from each round as the target calibration information so that color calibration information that makes the difference between the photographing color information and the standard color information small or minimal can be selected as final calibration information, and the selected target calibration information is more accurate. The target calibration information is used for performing the color calibration on the picture to be calibrated to perform color space conversion on the calibrated picture so that after the camera photographs the picture displayed by the display device, the photographed picture obtained is consistent in color with the picture to be calibrated, avoiding significant color differences caused by the display of different devices.

In one embodiment, the calibration module 1112 is further configured to calibrate the virtual scene picture in the first color space through the color calibration information to obtain the calibration picture.

The display module 1104 is further configured to convert the brightness of the calibration picture from the first color space to the second color space to obtain the virtual display picture in the second color space to display the virtual display picture through the display device.

The photographing module 1106 is further configured to acquire the fused picture by photographing the virtual display picture and the real scene simultaneously, the fused picture being in the third color space.

The conversion module 1108 is further configured to convert the fused picture from the third color space to the first color space to obtain the target scene picture.

In the embodiment, the virtual scene picture in the first color space is calibrated through the calibration information to obtain the calibration picture. The brightness of the calibration picture is converted from the first color space to the second color space to obtain the virtual display picture in the second color space to display the virtual display picture converted to the second color space through the display device. The fused picture by photographing the virtual display picture and the real scene simultaneously is acquired, and the fused picture is in the third color space. The fused picture is converted from the third color space to the first color space to obtain the target scene picture so that pictures displayed by different devices can be consistent in color, thereby effectively reducing the color difference caused by displaying the pictures through different devices.

In one embodiment, the picture to be calibrated is the virtual scene picture, and the calibration module 1112 is further configured to calibrate the virtual scene picture in the first color space through the target calibration information to obtain the calibration picture. The calibration picture corresponds to the first color space.

The display module 1104 is further configured to convert the brightness of the calibration picture from the first color space to the second color space to obtain the virtual display picture in the second color space to display the virtual display picture converted to the second color space through the display device.

The photographing module 1106 is further configured to acquire the fused picture by photographing the virtual display picture and the real scene simultaneously, the fused picture being in the third color space.

The conversion module 1108 is further configured to convert the fused picture from the third color space to the first color space to obtain the target scene picture.

In the embodiment, the virtual scene picture in the first color space is calibrated through the target calibration information to obtain the calibration picture, and the calibration picture corresponds to the first color space. The brightness of the calibration picture is converted from the first color space to the second color space to obtain the virtual display picture in the second color space to display the virtual display picture converted to the second color space through the display device. The fused picture by photographing the virtual display picture and the real scene simultaneously is acquired, and the fused picture is in the third color space. The fused picture is converted from the third color space to the first color space to obtain the target scene picture so that pictures displayed by different devices can be consistent in color, thereby effectively reducing the color difference caused by displaying the pictures through different devices.

In one embodiment, the real scene includes the real scene prop. The photographing module 1106 is further configured to photograph, through the camera, the scene formed by taking the virtual display picture as the background and the real scene prop as the foreground to obtain the fused picture.

In the embodiment, the camera captures the scenes formed by taking the virtual display picture as the background and the real scene prop as the foreground simultaneously to generate the fused picture so that the real scene prop and the virtual picture can exist in the same picture and space simultaneously after being fused, thereby skillfully combining virtual information and a real environment.

In one embodiment, various pure colors include red, green, blue, and white; the first color space is the sRGB color space; the second color space is the PQ color space; the display device is the LED display screen; the third color space is a color space corresponding to the camera for photographing each of the second pictures; and the standard color information includes relevant information about standard red, standard green, standard blue, and standard white in the sRGB color space.

In the embodiment, the first pictures generated based on red, green, blue, and white are acquired, and the brightness of the first pictures corresponding to red, green, blue, and white is converted from the first color space to the second color space to obtain the second pictures in the second color space so that the LED screen can accurately present the color information of each of the second pictures, avoiding the color difference caused by the LED screen directly displaying the first picture. The second pictures corresponding to red, green, blue, and white displayed on the LED screen are photographed by the camera to obtain corresponding photographed pictures. Each of the photographed pictures is converted from the third color space to the first color space to obtain the photographing color information corresponding to red, green, blue, and white in the first color space so that based on the difference between the photographing color information corresponding to red, green, blue, and white and standard red, green, blue, and white in the first color space, the color calibration information that calibrates red, green, blue, and white as standard red, standard green, standard blue, and standard white can be determined. Thus, through the color calibration information, the color calibration can be accurately performed on red, green, blue, and white in the picture and other colors composed of these several colors so that the color difference caused by different devices, such as the terminal, the LED screen, and the camera, is exactly offset, and pictures displayed by different devices are consistent in color, thereby effectively reducing the color difference caused by displaying the pictures through different devices.

The various modules in the above-mentioned color calibration apparatus may be implemented in whole or in part by software, hardware, and combinations thereof. The above-mentioned modules may be embedded in or independent of a processor in the computer device in a hardware form or may be stored in a memory in a computer device in a software form so that the processor calls to perform the corresponding operations of the above-mentioned modules.

Figure 13:
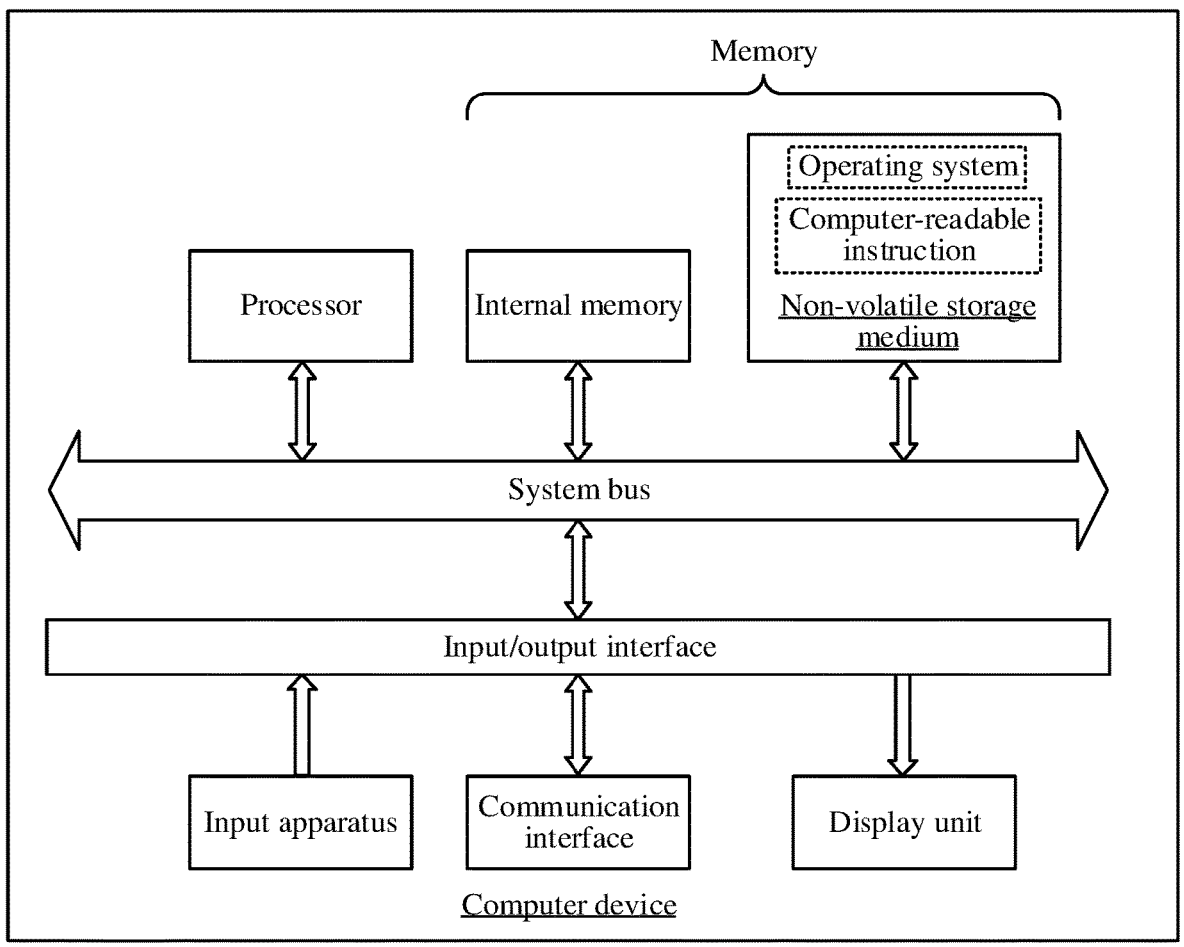
FIG. 13 is a diagram of an internal structure of a computer device according to an embodiment of present disclosure.

In one embodiment, a computer device is provided, which may be a terminal or a server. Taking the terminal as an example, the internal structure diagram thereof may be as shown in FIG. 13. The computer device includes a processor, a memory, an input/output interface, a communication interface, a display unit, and an input apparatus. The processor, the memory, and the input/output interface are connected to each other through a system bus, and the communication interface, the display unit, and the input apparatus are connected to the system bus through the input/output interface. The processor of the computer device is configured to provide calculation and control capabilities. The memory of the computer device includes a non-volatile readable storage medium and an internal memory. The non-volatile storage medium stores an operating system and a computer program. The internal memory provides an environment for the operation of the operating system and the computer program in the non-volatile storage medium. The input/output interface of the computer device is configured to exchange information between the processor and an external device. The communication interface of the computer device is configured to communicate with an external terminal in a wired or wireless manner, the wireless manner may be implemented by WIFI, a mobile cellular network, near field communication (NFC), or other technologies. The computer program is executed by the processor to implement a color calibration method. The display unit of the computer device is configured to form a visual picture, and may be a display screen, a projection apparatus, or a virtual reality imaging apparatus. The display screen may be a liquid crystal display screen or an electronic ink display screen. The input apparatus of the computer device may be a touch layer covered on the display screen, and may also be a key, a trackball, or a touch control panel arranged on the housing of the computer device, and may also be an external keyboard, a touch control panel, or a mouse, etc.

It will be appreciated by a person skilled in the art that the structure shown in FIG. 13 is a block diagram of only a portion of the structure relevant to the solution of the present disclosure and does not constitute a limitation on the computer device to which the solution of the present disclosure applies. A specific computer device may include more or less elements than those shown in the figures, a combination of some elements, or elements with different arrangements.

In one embodiment, a computer device is provided, including a memory and one or more processors. The memory stores computer-readable instructions, and when executed by the processor, the computer-readable instructions cause the processor to perform the steps of the method embodiments described above.

In one embodiment, one or more non-volatile readable storage media storing computer-readable instructions are provided, having stored thereon a computer program, and when executed by a processor, the computer-readable instructions perform the steps of the method embodiments described above.

In one embodiment, a computer program product is provided including computer readable instructions, and when executed by one or more processors, the computer-readable instructions cause the one or more processor to perform the steps of the method embodiments described above.

It should be noted that the user information (including but not limited to user device information, user personal information, etc.) and data (including but not limited to data used for analysis, data used for storage, data used for displaying, etc.) involved in the present disclosure are information and data authorized by the user or fully authorized by all parties, and the collection, use, and processing of relevant data shall comply with relevant laws and regulations and standards of relevant countries and regions.

It will be appreciated by a person skilled in the art that implementing all or part of the flow of the methods of the embodiments described above may be accomplished by instructing the associated hardware through the computer-readable instructions. The computer-readable instructions may be stored on a non-volatile computer-readable storage medium, and when executed, may include the flow of the embodiments of the methods described above. Any references to memory, databases, or other media used in embodiments provided herein may include at least one of a non-volatile and a volatile memory. The non-volatile memory may include a read-only memory (ROM), a magnetic tape, a floppy disk, a flash memory, an optical memory, a high-density embedded non-volatile memory, a ReRAM memory, a c random access memory (MRAM), a ferroelectric random access memory (FRAM), a phase change memory (PCM), a graphene memory, and the like. The volatile memory may include a random access memory (RAM) or an external cache memory, etc. As illustration and not limitation, the RAM may be in a plurality of forms such as static random access memory (SRAM) or dynamic random access memory (DRAM). The databases involved in the embodiments provided by the present disclosure may include at least one of relational databases and non-relational databases. The non-relational databases may include, but not limited to, distributed databases based on blockchain, and the like. The processors involved in the embodiments provided by the present disclosure may be, but not limited to, a general purpose processor, a central processor, a graphics processor, a digital signal processor, a programmable logic device, a quantum computation-based data processing logic device, etc.

The term module (and other similar terms such as sub-module, unit, subunit, etc.) in the present disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory) Likewise, a processor (or processors and memory) can be used to implement one or more modules. Moreover, each module can be part of an overall module that includes the functionalities of the module.

The technical features of the above embodiments may be combined in any way, and in order to make the description concise, not all the possible combinations of the technical features in the above-mentioned embodiments are described; however, as long as there is no contradiction between the combinations of these technical features, they should be considered as the scope of the description.

The above embodiments express only several embodiments of the present disclosure, which are described in a more specific and detailed manner, but are not to be construed as a limitation of the scope of the invention. For a person skilled in the art, several deformations and improvements may be made without departing from the conception of the present disclosure, all of which fall within the scope of the present disclosure. Accordingly, the protection sought herein is as set forth in the claims below.

What is claimed is:

1. A color calibration method performed by a computer device, the method comprising:
    acquiring a plurality of first pictures in a first color space, a first picture of the plurality of first pictures being generated by a single color;
    converting brightness of the plurality of first pictures from the first color space to a second color space to obtain second pictures in the second color space to display the second pictures through a display device;
    acquiring photographed pictures by photographing the second pictures displayed by the display device, the photographed pictures corresponding to a third color space;
    converting the photographed pictures from the third color space to the first color space to obtain photographing color information corresponding to the photographed pictures in the first color space; and
    determining a difference between standard color information corresponding to the first pictures of the first color space and the photographing color information corresponding to the photographed pictures in the first color space, and determining color calibration information according to the difference, the color calibration information being used for performing color calibration on a newly acquired picture.

2. The method according to claim 1, wherein converting the brightness of the first pictures from the first color space to a second color space to obtain second pictures in the second color space to display the second pictures through the display device comprises:
    encoding the brightness of the first pictures in the first color space to obtain encoded signals in the second color space;
    decoding the encoded signals in the second color space to obtain the second pictures in the second color space; and
    displaying the second pictures through the display device.

3. The method according to claim 1, wherein acquiring the photographed pictures by photographing the second pictures displayed by the display device comprises:
    photographing the second pictures displayed by the display device through a camera, and receiving the photographed pictures by the camera in real time, the camera corresponding to the third color space.

4. The method according to claim 1, wherein converting the photographed pictures from the third color space to the first color space to obtain the photographing color information corresponding to the photographed pictures in the first color space comprise:
    performing key point sampling on the photographed pictures to obtain key points corresponding to the photographed pictures;
    determining original color information about the key points of the photographed pictures, and for the photographed pictures, determining intermediate color information corresponding to the photographed pictures based on the original color information about the key points of the photographed pictures; and converting the intermediate color information into the first color space to obtain the photographing color information corresponding to the photographed pictures in the first color space.

5. The method according to claim 4, wherein performing the key point sampling on the photographed pictures to obtain the key points corresponding to the photographed pictures comprises:

determining a center point of the photographed picture;

performing sampling in a plurality of directions of center points to obtain sampling points; and taking the center points and the sampling points as the key points corresponding to respective photographed pictures.

6. The method according to claim 4, wherein converting the intermediate color information into the first color space to obtain the photographing color information corresponding to the photographed pictures in the first color space comprises:

performing brightness conversion on the intermediate color information of which brightness is of a first type to obtain intermediate color information of which brightness is of a linear second type; and performing color conversion on the intermediate color information of which the brightness is of the second type to obtain the photographing color information corresponding to the photographed pictures in the first color space.

7. The method according to claim 6, wherein performing the brightness conversion on the intermediate color information of which brightness is of a first type to obtain the intermediate color information of which the brightness is of the second type comprises:

acquiring a brightness mapping relationship, the brightness mapping relationship representing a conversion relationship between the first type and the second type of brightness; and converting the brightness of the intermediate color information from the first type to the second type through the brightness mapping relationship to obtain the intermediate color information of which the brightness is of the second type.

8. The method according to claim 1, wherein the newly acquired picture for calibration is a virtual scene picture, and the method further comprises:

calibrating the virtual scene picture in the first color space through the color calibration information to obtain a calibration picture;

converting brightness of the calibration picture from the first color space to the second color space to obtain a virtual display picture in the second color space to display the virtual display picture through the display device;

acquiring a fused picture by photographing the virtual display picture and a real scene simultaneously, the fused picture being in the third color space; and converting the fused picture from the third color space to the first color space to obtain a target scene picture.

9. The method according to claim 1, further comprising:

after determining the color calibration information, calibrating a plurality of third pictures in the first color space based on the color calibration information, to obtain a plurality of calibrated third pictures, each third picture being generated by a single ene pure color;

taking the calibrated third pictures as the first pictures, and performing a next round of operations, including the operation of converting brightness of the first pictures from the first color space to the second color space, the operation of acquiring the photographed pictures, the operation of converting the photographed pictures from the third color space to the first color space, and the operation of determining the difference, to obtain color calibration information corresponding to the next round; and selecting color calibration information satisfying a calibration condition from color calibration information obtained from each round as target calibration information, the target calibration information being used for performing the color calibration on the newly acquired picture.

10. The method according to claim 9, wherein the newly acquired picture is a virtual scene picture, and the method further comprises:

calibrating the virtual scene picture in the first color space through the target calibration information to obtain a calibration picture;

converting brightness of the calibration picture from the first color space to the second color space to obtain a virtual display picture in the second color space to display the virtual display picture through the display device;

acquiring a fused picture by photographing the virtual display picture and a real scene simultaneously, the fused picture being in the third color space; and converting the fused picture from the third color space to the first color space to obtain a target scene picture.

11. The method according to claim 10, wherein the real scene comprises a physical prop; and acquiring the fused picture by photographing the virtual display picture and the real scene simultaneously comprises:

photographing, through a camera, a scene formed by taking the virtual display picture as a background and the physical prop as a foreground to obtain the fused picture.

12. The method according to claim 1, wherein the single color is one of red, green, blue, and white; the first color space is a standard red green blue (sRGB) color space; the second color space is a perceptual quantizer (PQ) color space; the display device is a light-emitting diode (LED) display screen; the third color space is a color space corresponding to a camera for photographing the second pictures; and the standard color information comprises relevant information about standard red, standard green, standard blue, and standard white in the sRGB color space.

13. A computer device comprising a memory and one or more processors, the memory storing computer-readable instructions that, when being executed, causes the one or more processors to perform:

acquiring a plurality of first pictures in a first color space, a first picture of the plurality of first pictures being generated by a single color;

converting brightness of the plurality of first pictures from the first color space to a second color space to obtain second pictures in the second color space to display the second pictures through a display device;

acquiring photographed pictures by photographing the second pictures displayed by the display device, the photographed pictures corresponding to a third color space;

converting the photographed pictures from the third color space to the first color space to obtain photographing color information corresponding to the photographed pictures in the first color space; and determining a difference between standard color information corresponding to the first pictures of the first color space and the photographing color information corresponding to the photographed pictures in the first color space, and determining color calibration information according to the difference, the color calibration information being used for performing color calibration on a newly acquired picture.

14. The computer device according to claim 13, wherein the one or more processors are further configured to perform:

encoding the brightness of the first pictures in the first color space to obtain encoded signals in the second color space;

decoding the encoded signals in the second color space to obtain the second pictures in the second color space; and displaying the second pictures through the display device.

15. The computer device according to claim 13, wherein the one or more processors are further configured to perform:

photographing the second pictures displayed by the display device through a camera, and receiving the photographed pictures by the camera in real time, the camera corresponding to the third color space.

16. The computer device according to claim 13, wherein the one or more processors are further configured to perform:

performing key point sampling on the photographed pictures to obtain key points corresponding to the photographed pictures;

determining original color information about the key points of the photographed pictures, and for the photographed pictures, determining intermediate color information corresponding to the photographed pictures based on the original color information about the key points of the photographed pictures; and converting the intermediate color information into the first color space to obtain the photographing color information corresponding to the photographed pictures in the first color space.

17. The computer device according to claim 16, wherein the one or more processors are further configured to perform:

determining a center point of the photographed picture;

performing sampling in a plurality of directions of center points to obtain sampling points; and taking the center points and the sampling points as the key points corresponding to respective photographed pictures.

18. The computer device according to claim 16, wherein the one or more processors are further configured to perform:

performing brightness conversion on the intermediate color information of which brightness is of a first type to obtain intermediate color information of which brightness is of a second type; and performing color conversion on the intermediate color information of which the brightness is of the second type to obtain the photographing color information corresponding to the photographed pictures in the first color space.

19. The computer device according to claim 18, wherein the one or more processors are further configured to perform:

acquiring a brightness mapping relationship, the brightness mapping relationship representing a conversion relationship between the first type and the second type of brightness; and converting the brightness of the intermediate color information from the first type to the second type through the brightness mapping relationship to obtain the intermediate color information of which the brightness is of the second type.

20. A non-transitory computer readable storage medium storing a computer program that, when being executed, causes one or more processors to perform:

acquiring a plurality of first pictures in a first color space, a first picture of the plurality of first pictures being generated by a single color;

converting brightness of the plurality of first pictures from the first color space to a second color space to obtain second pictures in the second color space to display the second pictures through a display device;

acquiring photographed pictures by photographing the second pictures displayed by the display device, the photographed pictures corresponding to a third color space;

converting the photographed pictures from the third color space to the first color space to obtain photographing color information corresponding to the photographed pictures in the first color space; and determining a difference between standard color information corresponding to the first pictures of the first color space and the photographing color information corresponding to the photographed pictures in the first color space, and determining color calibration information according to the difference, the color calibration information being used for performing color calibration on a newly acquired picture.

* * * * *